United States Patent [19]
Yoshida et al.

[11] Patent Number: 6,026,558
[45] Date of Patent: Feb. 22, 2000

[54] METHOD FOR MANUFACTURING ARMATURE OF ROTATING ELECTRIC MACHINE

[75] Inventors: Masashi Yoshida, Nishikamo-gun; Hideki Ichikawa, Inazawa; Kenichi Shibayama, Anjo; Yuujirou Kuwamura; Masahiro Takada, both of Okazaki; Koji Katahira, Chiryu; Koji Shiga, Okazaki, all of Japan

[73] Assignee: Denso Corporation, Kariya, Japan

[21] Appl. No.: 09/228,421

[22] Filed: Jan. 12, 1999

[30] Foreign Application Priority Data

Feb. 19, 1998 [JP] Japan ................................. 10-036944
Nov. 10, 1998 [JP] Japan ................................. 10-319368

[51] Int. Cl.$^7$ ................................................ H02K 15/02
[52] U.S. Cl. ........................... 29/598; 310/201; 310/271; 228/28; 228/179.1; 228/246
[58] Field of Search ................................. 29/598; 310/42, 310/201, 271; 228/28, 179.1, 246

[56] References Cited

U.S. PATENT DOCUMENTS

| | | | |
|---|---|---|---|
| 3,586,943 | 6/1971 | Gonzalez | 318/257 |
| 5,508,577 | 4/1996 | Shiga et al. | 310/201 |
| 5,687,471 | 11/1997 | Noguchi et al. | 29/598 |
| 5,778,512 | 7/1998 | Ichikawa et al. | 29/598 |

Primary Examiner—Carl E. Hall
Assistant Examiner—Davide Caputo
Attorney, Agent, or Firm—Pillsbury Madison & Sutro, LLP

[57] ABSTRACT

An armature for an electric rotating machine has a plurality of outer coil elements and a plurality of inner coil elements. Each of the coil elements has end protrusions extending axially outwardly from an axial side of an armature. The end protrusions facing each other in a radial direction is joined by an arc welding. In one method, the end protrusion of the outer coil element is formed a projection at an axially inside of an axial end of the protrusion. The end protrusions are held spaced apart from each other in the radial direction while contacting only through the projection. The axial ends of the protrusions are welded by swinging the welding arc. In another method, a ring-shaped brazing material is interposed between the end protrusions. The brazing material is melted by the welding arc to weld the end protrusions, while cutting out the brazing material existing between two adjacent pairs of the end protrusions.

21 Claims, 24 Drawing Sheets

FIG. 35

WELDING CONDITIONS

| FACTOR | CONDITION |
|---|---|
| WELDING CURRENT | LESS THAN 30A |
| CRATER FILLER CURRENT | LESS THAN 20A |
| CRATER FILLER PERIOD | LESS THAN 1 SECOND |
| ARC LENGTH | 0.5 − 1.5mm |
| WEAVING TIMES | 2 − 7 TIMES |
| WEAVING SWING SPEED | 5 − 15mm / SECOND |
| WEAVING SWING WIDTH | LESS THAN 2 mm |
| ELECTRODE DIAMETER | $\phi$ 0.2 − 2.4 mm |
| ELECTRODE MATERIAL | PURE TUNGSTEN, TUNGSTEN WITH CERIUM, TUNGSTEN WITH THORIUM, WL, WY |
| ELECTRODE TOP END DIAMETER | LESS THAN $\phi$1.0 mm |
| ELECTRODE TOP END ANGLE | 10 − 50° |
| GAS FLOW RATE | 2 − 15L / MIN. |
| GAS PRE − FLOW | 2 − 5 SECONDS |
| GAS AFTER − FLOW | LESS THAN 5 SECONDS |

6,026,558

METHOD FOR MANUFACTURING ARMATURE OF ROTATING ELECTRIC MACHINE

CROSS REFERENCE TO RELATED APPLICATION

This application relates to and incorporates herein by reference Japanese Patent Applications No. 10-36944 filed on Feb. 19, 1998 and No. 10-319368 filed on Nov. 10, 1998.

BACKGROUND OF THE INVENTION

1. Field of the Invention

The present invention relates to an armature for a rotating electric machine and a manufacturing method for the armature.

2. Description of Related Art

U.S. Pat. No. 5,508,577 (JP-A-7-231618) proposes an improved type armature coil structure for a rotating electric machine. This armature coil comprises outer coil elements and inner coil elements, which are assembled in an armature core and are joined to each other electrically and mechanically at the end protrusions thereof. Further, U.S. Pat. No. 5,778,512 (JP-A-9-182337) proposes to join the end protrusions of the outer and inner coil elements by arc welding method.

However, the arc welding is likely to cause an undesired joined part between the end protrusions of the outer and lower coil elements, because the outer coil element has a larger thermal capacitance than the inner coil element. That is, the end protrusion of the inner coil element tend to melt earlier than that of the outer coil element, when the welding arc is applied to the inner coil element first. The end protrusion of the inner coil element may, in the worst instance, melt and separate from the inner coil element before joined to the end protrusion of the outer coil element. Even in the case in which the welding arc is directed to the end protrusion of the outer coil element first, the welding arc tend to swing to either the outer or inner coil element because of a contact between the two end protrusions.

Further, the joined part produced between the end protrusions by the arc welding expands outwardly in its radial direction. The centrifugal force exerted to the expanded joined part becomes excessive. The arc welding also causes the crystal grains in the joined part to become coarse. Thus, it becomes hard to ensure mechanical strength (anti-fatigue strength) of the joined part against the centrifugal force.

As an alternative to the arc welding, a TIG-brazing may be used. However, the TIG-brazing necessitates additional steps to provide brazing materials sized in correspondence with the end protrusions to be brazed, and to insert or mount the brazing materials between or on the end protrusions to be brazed.

SUMMARY OF THE INVENTION

It is therefore an object of the present invention to provide a manufacturing method for an armature having a structure for ensuring starting of welding from an end protrusion of an outer coil element.

It is another object of the present invention to provide a manufacturing method for an armature of a rotating electric machine having enhanced anti-fatigue strength in a joined part.

According to one aspect of the present invention, outer coil elements and inner coil elements are assembled on an armature core, and axially extending end protrusions of each pair of the outer coil element and the inner coil element are joined by an arc welding to form an armature coil. The two end protrusions laid one above the other are held in contact with and in non-contact with each other in the radial direction of the armature core at the sides close to and away from the armature core, respectively, before arc welding. That is, the end protrusions of the outer coil element and the inner coil element are spaced apart in the radial direction. The welding arc is directed to the end protrusion of the outer coil element first.

According to another aspect of the present invention, end protrusions of an outer coil element and an inner coil element are spaced apart from each other in a radial direction of an armature core. A ring-shaped brazing material is inserted into and melted by a welding arc, so that the space is filled with the melted brazing material to provide a completely joined part between the two end protrusions. Preferably, the welding arc is swung along a circumference of the ring-shaped brazing material to melt and cut the brazing material which exists between two pairs of the end protrusions of the outer coil element and the inner coil element.

BRIEF DESCRIPTION OF THE DRAWINGS

Other objects, features and advantages of the present invention will become more apparent from the following detailed description made with reference to the accompanying drawings. In the drawings:

FIG. 35 is a table showing welding conditions for welding the brazing material by the welding apparatus shown in FIG. 34;

DETAILED DESCRIPTION OF THE PREFERRED EMBODIMENT

Figure 1:
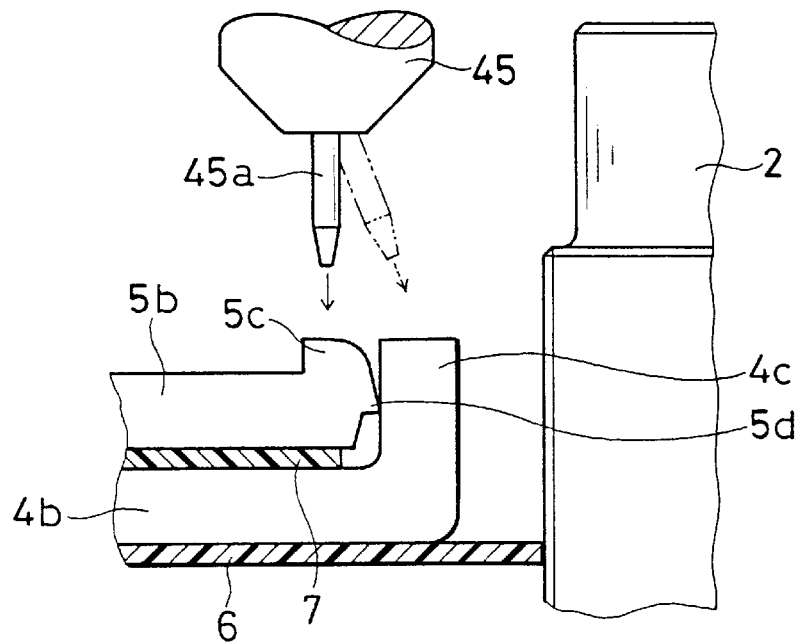
FIG. 1 is a schematic view showing a joining method of an outer coil element and an inner coil element used in an armature according to a first embodiment of the present invention.
Figure 2:
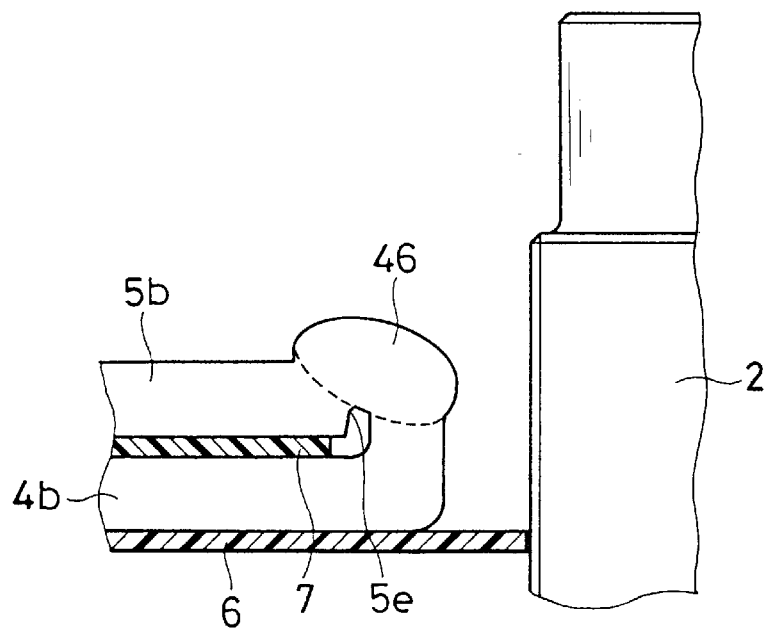
FIG. 2 is an enlarged view showing end protrusions of the outer coil element and the inner coil element joined by the joining method shown in FIG. 1.
Figure 3:
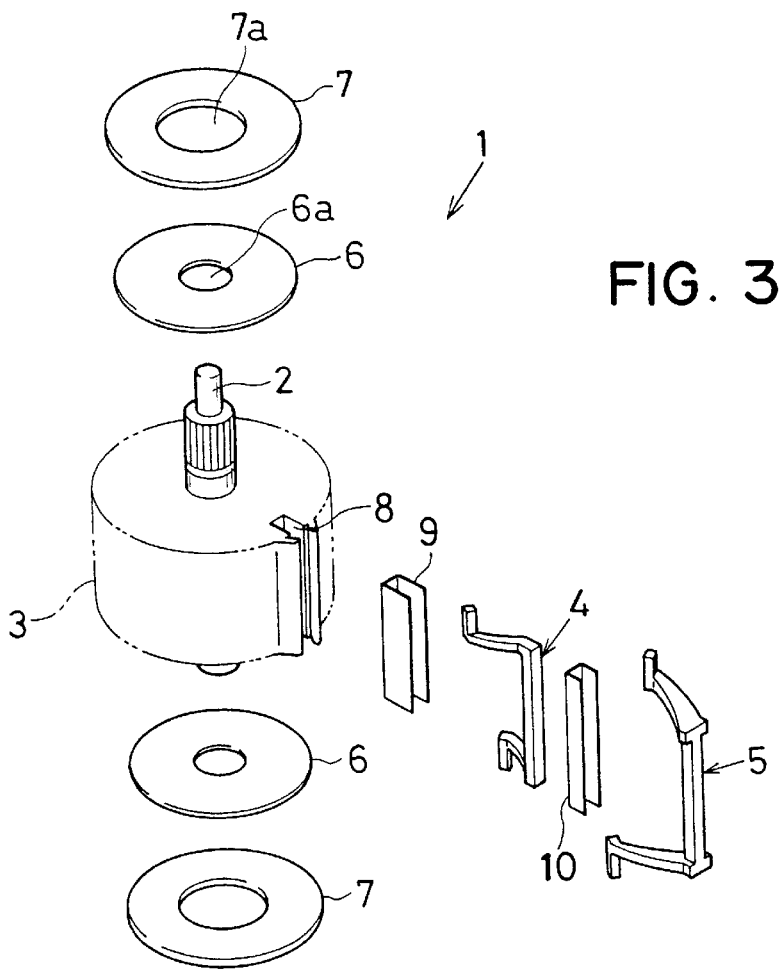
FIG. 3 is an exploded view showing the armature according to the first embodiment.
Figure 4:
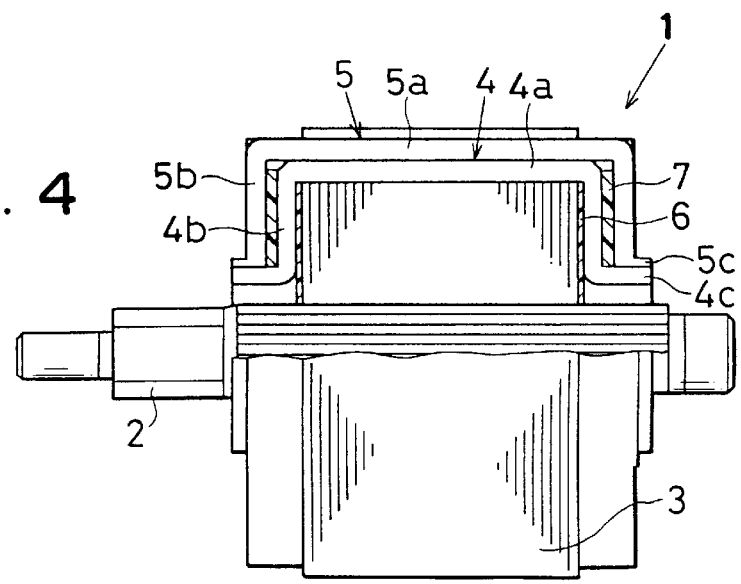
FIG. 4 is a side view showing partly in section the armature shown in FIG. 3.

Referring first to FIGS. 1–4, particularly to FIGS. 3 and 4, an armature 1 is for a rotating electric machine, which may be used preferably as a starter motor for an internal combustion engine. It comprises a rotary shaft 2, an armature core 3, an armature coil (inner coil elements 4 and outer coil elements 5), and ring-shaped electrical insulators (inner insulators 6 and outer insulators 7). The armature core 3 is constructed by a plurality of disk-shaped magnetic sheets stacked in the axial direction of the shaft 2 and press-fitted around the shaft 2. The armature core 3 has a plurality (e.g., 25) of slots 8, each of which extends in the axial direction on the outer periphery of the armature core 3. Both coil elements 4 and 5 are made of a low electric resistance material such as pure copper or pure aluminum.

Each inner coil element 4 has a straight trunk part 4a, a pair of end parts 4b extending perpendicularly from the straight trunk part 4a in the radially inward direction of the armature core 3, and end protrusions 4c extending perpendicularly from the end parts 4b in the axially outward direction of the armature core 3. The end parts 4b are inclined in opposite circumferential directions with respect to the trunk part 4a.

The inner coil element 4 is assembled on the armature core 3, as shown in FIG. 4, with its trunk part 4a being disposed in the inner side of the slot 8. The trunk part 4a is electrically insulated from the armature core 3 by an insulator 9 having a U-shaped section, as shown in FIG. 3. Alternatively, the trunk part 4a may be insulated by winding an insulating tape thereon.

Each outer coil element 5 has a straight trunk part 5a slightly longer than the trunk part 4a, a pair of end parts 5b extending perpendicularly from the trunk part 5a in the radially inward direction of the armature core 3, and end protrusions 5c extending perpendicularly from the end parts 5b in the axially outward direction of the armature core 3. The end parts 5b are inclined in opposite circumferential directions with respect to the trunk part 5a. Although not shown in the figures, one of the end parts 5b of each outer coil element 5 is used as a commutator piece on which a brush (not shown) slides.

The outer coil element 5 is assembled on the armature core 3, as shown in FIG. 4, with its trunk part 5a being disposed on the trunk part 4a of the inner coil element 4. The trunk part 5a is electrically insulated from the trunk part 4a of the inner coil element 4 and from the armature core 3 by an insulator 10 having a U-shaped section, as shown in FIG. 3. Alternatively, the trunk part 5a may be insulated by winding an insulating tape thereon. The end protrusions 4c and 5c are joined to each other as described in detail with reference to FIGS. 1 and 2.

The ring-shaped inner insulators 6 are made of resin and have central holes 6a for receiving the shaft 2 therein. The insulators 6 are mounted on axial sides of the armature core 3 before the inner coil element 4 is assembled on the armature core 3. Similarly, the ring-shaped outer insulators 7 are made of resin and have central holes 7a. The outer insulators 7 are thicker than the inner insulators 6, and the central hole 7a are larger than the central hole 6a to receive both shaft 2 and end protrusions 4c of the inner coil element 4. The insulators 7 are mounted on the end parts 4b of the inner coil element 4 before the outer coil element 5 is assembled on the armature core 3.

First Embodiment

The outer coil element 5 is manufactured as follows. It is to be noted that the inner coil element 4 may be manufactured in the similar manner as well.

Figure 5A:
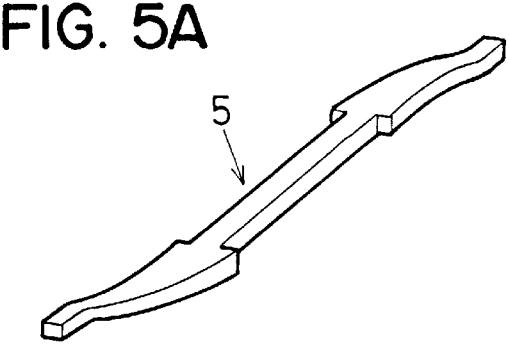
FIGS. 5A–5E are schematic views showing a manufacturing method of the outer coil element used in the first emebodiment.
Figure 5B:
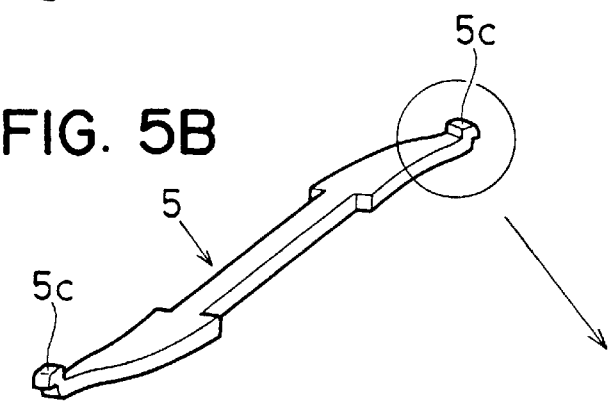
Figure 5C:
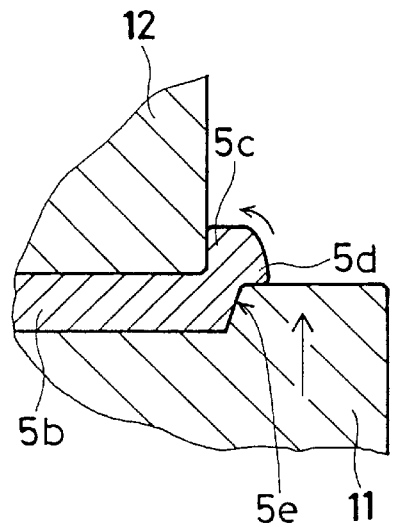
Figure 5D:
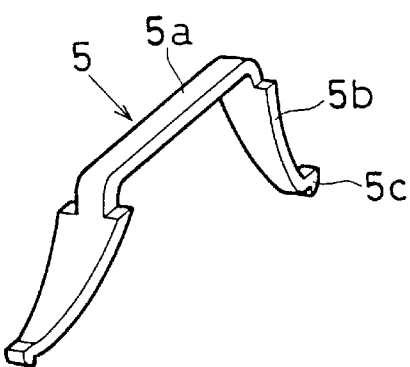
Figure 5E:
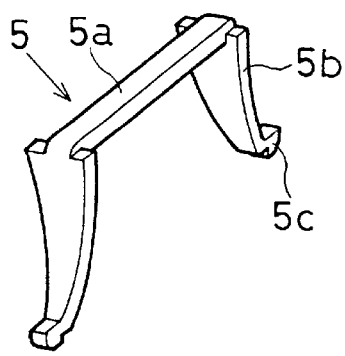
Figure 6:
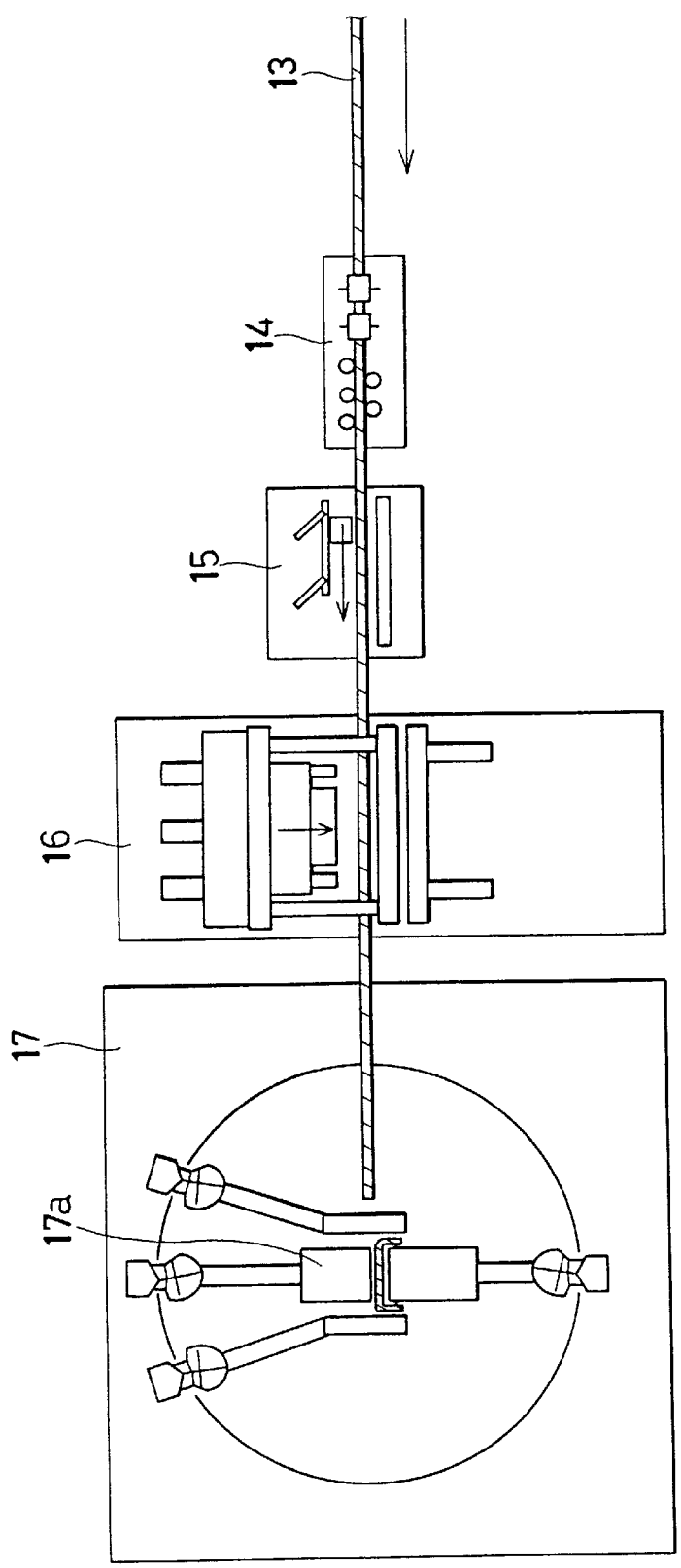
FIG. 6 is a schematic view showing a manufacturing device for the outer coil element used in the first embodiment.

(1) The outer coil element 5 is punched out into a flat blank shape shown in FIG. 5A from a conductive plate (not shown). Then end protrusions 5c are formed by embossing as shown in FIG. 5B. In this process, as shown in FIG. 5C, a die 11 and a punch 12 are used to emboss the end protrusions 5c by the die 11 toward the punch 12. Thus, a projection 5d is formed on the inner (lower) side of the end protrusion 5c. This projection 5d is provided at a more root side (lower side in FIG. 5C) of the axial side end (upper end surface in FIG. 5C) of the end protrusion 5c, so that it smoothly inclines toward the axial side end. Further, at the root side of the end protrusion 5c, a concavity 5e is formed in correspondence with the shape of the die 11. The end parts 5b are bent generally perpendicularly against the trunk part 5a. Finally, the end parts 5b are shaped.

Figure 7:
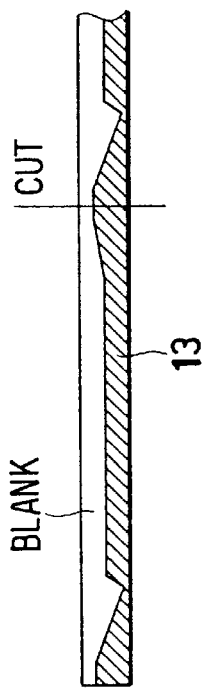
FIG. 7 is a sectional view showing a blank form of the outer coil element used in the first embodiment.

(2) The outer coil element 5 is preferably manufactured automatically by the use of a straightening device 14, feeding device 15, punching device 16 and cutting-bending device 17. First, a coil material 13 is straightened by the straightening device 14 and is fed by the feeding device 15 to the punching device 16. A plurality of blank forms of the outer coil element 5 are punched out by the punching device 16 from the coil material 13. The blank forms are then cut into a single piece of the outer coil element 5 as shown in FIG. 7.

Figure 8:
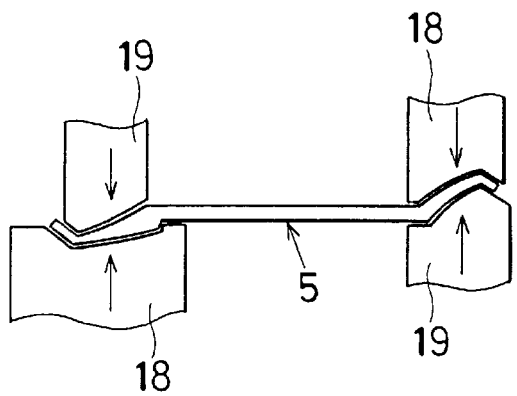
FIG. 8 is a schematic view showing a process for forming end protrusions of the outer coil element used in the first embodiment.
Figure 9:
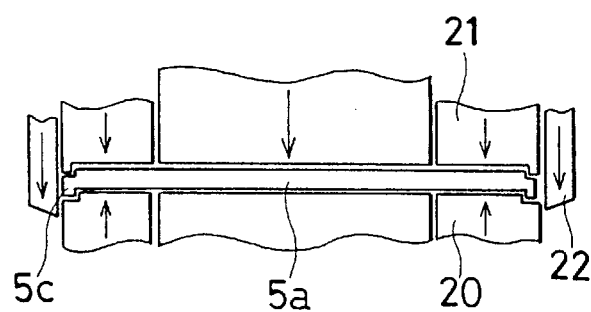
FIG. 9 is a schematic view showing a process for punching out the end protrusions of the outer coil element used in the first embodiment.
Figure 10:
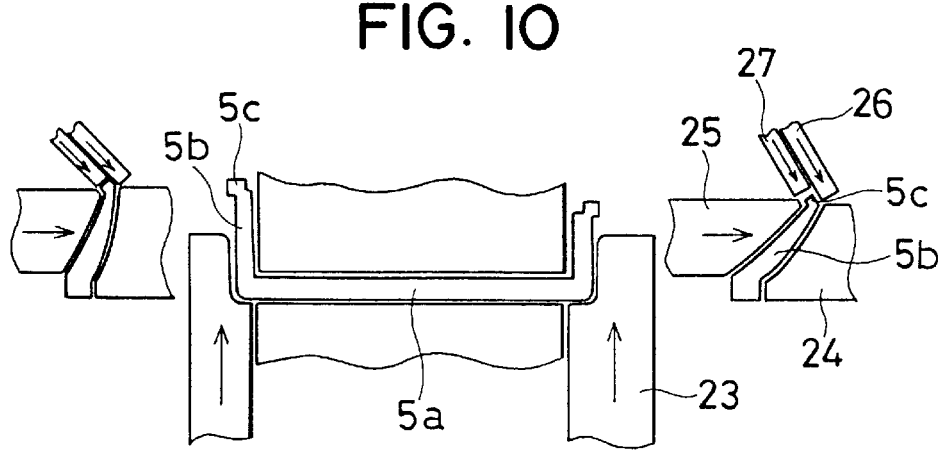
FIG. 10 is a schematic view showing a final process for manufacturing the outer coil element used in the first embodiment.

After the straight part of the blank form is held by a core part 17a of the cutting-bending device 17, the end parts 5b are inclined slightly, a predetermined angle, from the straight part by moving punches 18 and 19 as shown in FIG. 8. At the same time, as shown in FIG. 9, the end protrusions 5c are punched out by a die 20, punch 21 and rough guide 22. The projection 5d is formed on the inner side of each outer end protrusion 5c (FIG. 5C) during this punching step. Then, as shown in FIG. 10, the end parts 5b are bent further by punches 23 so that the end parts 5b become perpendicular to the straight part, trunk part 5c. Thereafter, the end protrusions 5c are shaped by a punch 27, while being guided in position by dies 24, 25 and 26.

Figure 11:
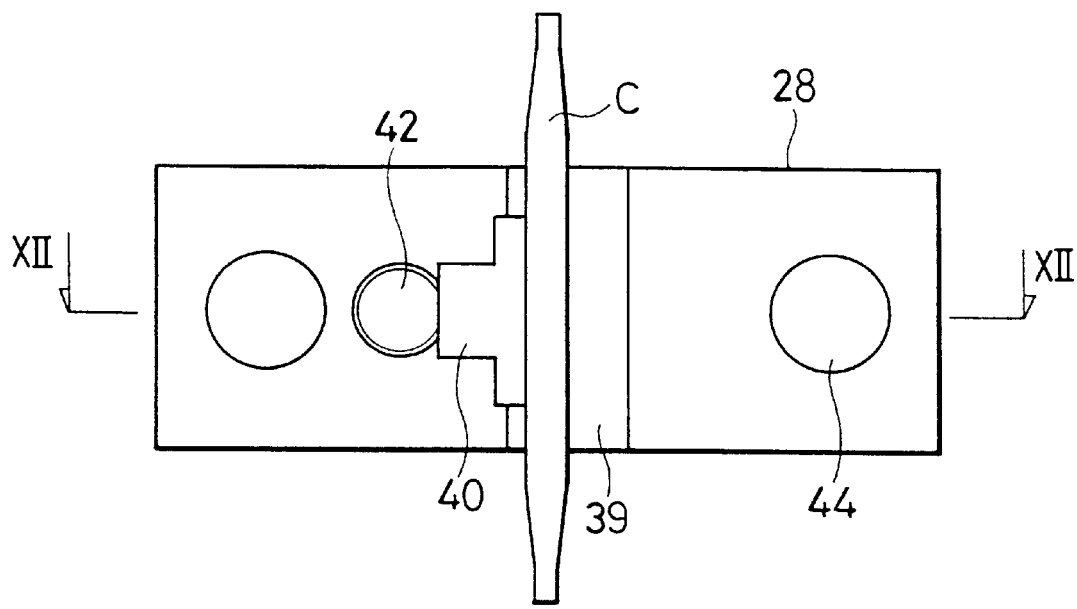
FIG. 11 is a plan view showing a pallet for carrying the coil element used in the first embodiment.
Figure 12:
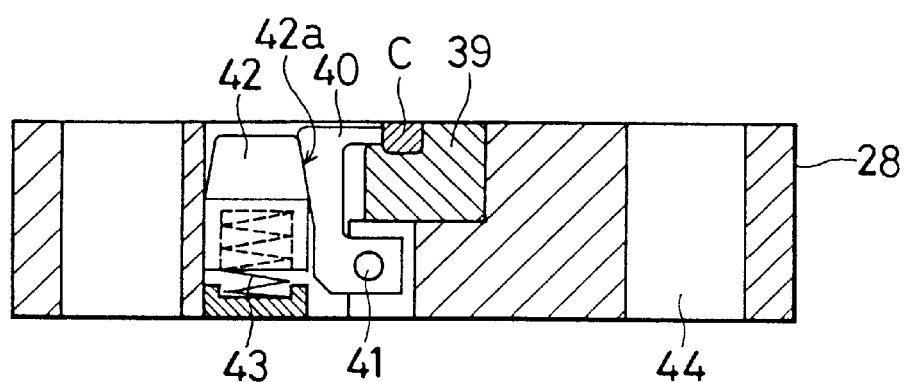
FIG. 12 is a sectional view showing the pallet shown in FIG. 11.

(3) Alternatively to the above methods (1) and (2), the outer coil element 5 may be manufactured by placing, on a pallet 28 shown in FIGS. 11 and 12, a blank form punched out from a coil material C. The pallet 28 is used as a part of a forming die device 29.

Figure 13:
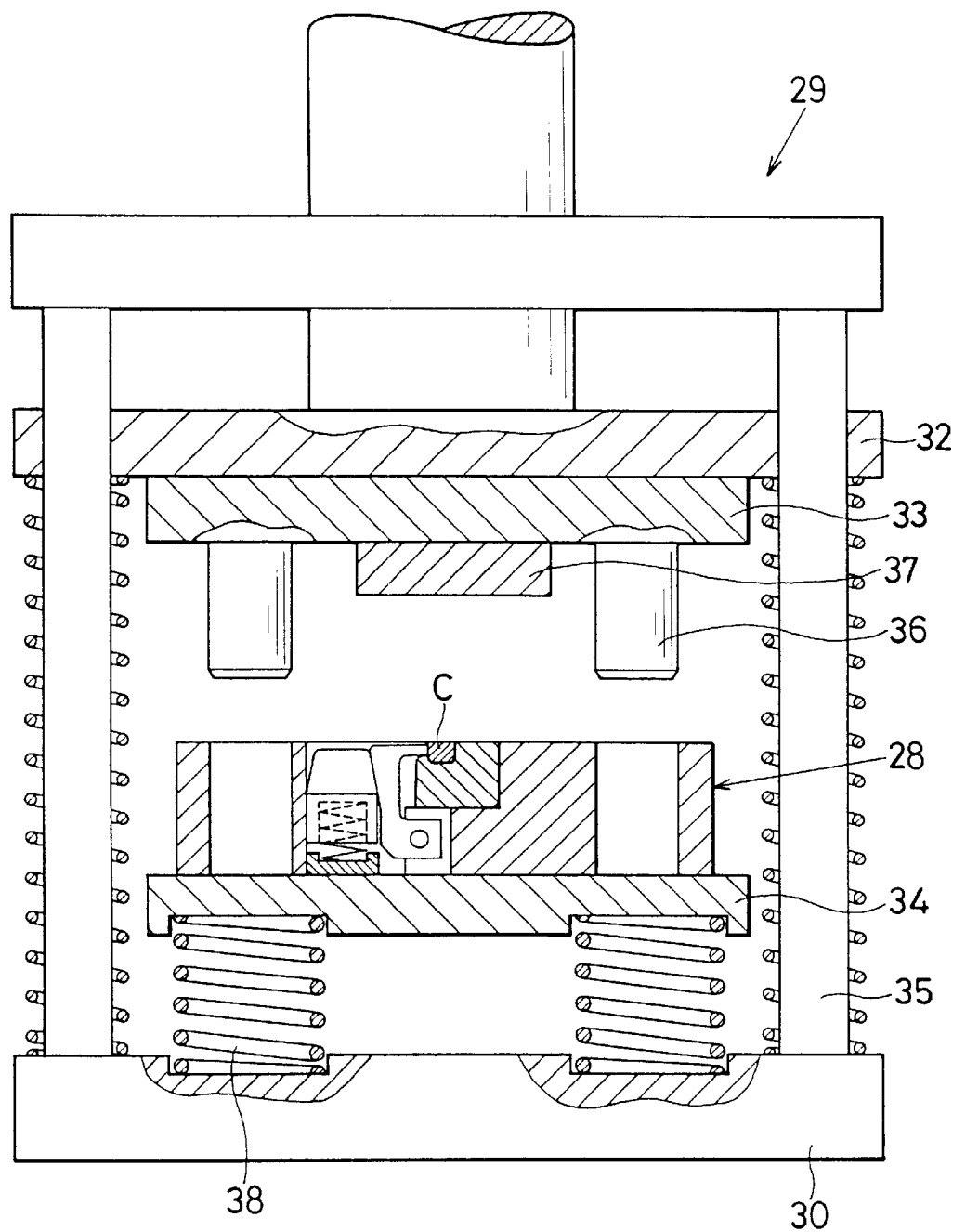
FIG. 13 is a side sectional view showing a manufacturing device for the coil element used in the first embodiment.
Figure 14:
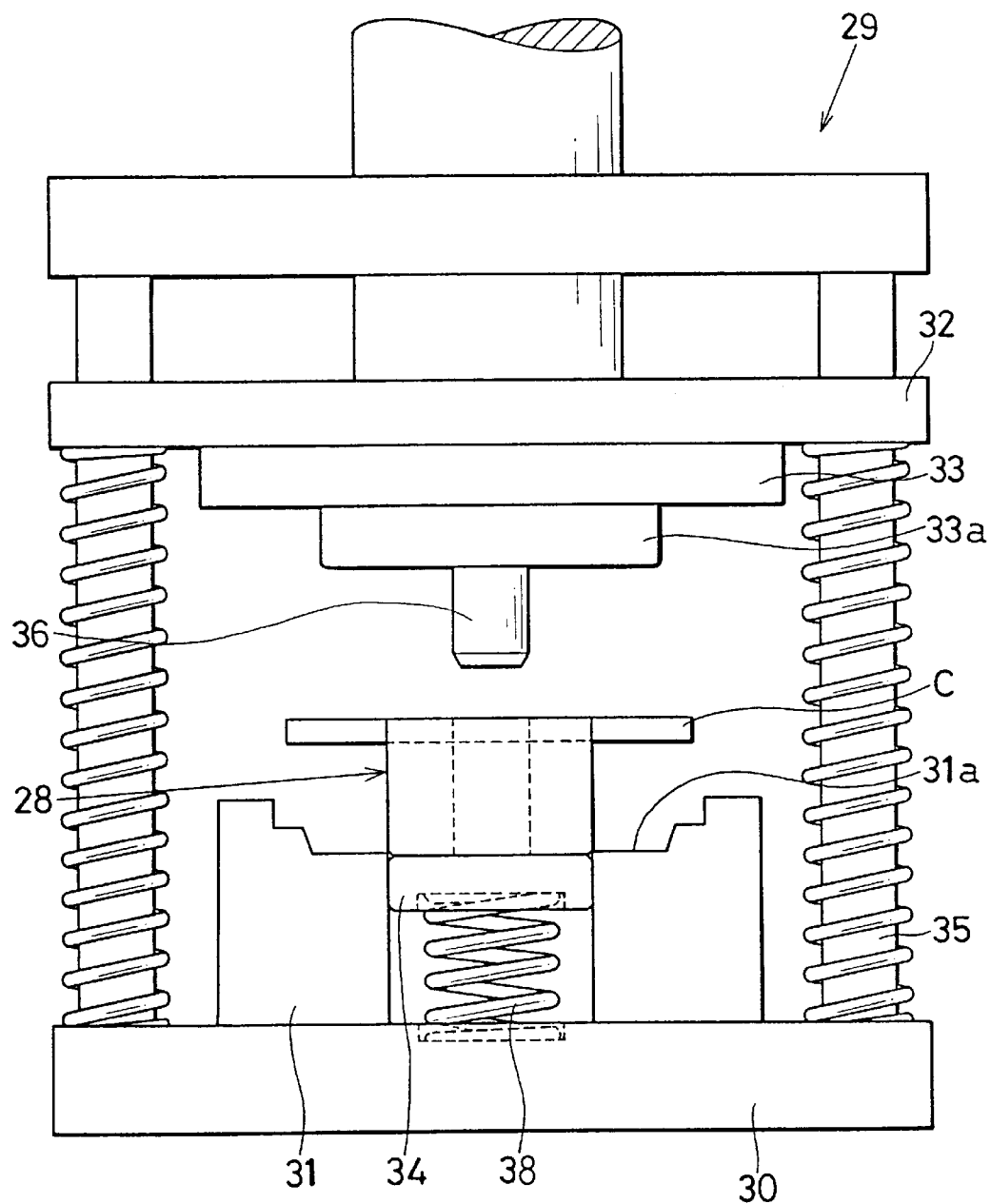
FIG. 14 is a front sectional view showing the manufacturing device shown in FIG. 13.

The die device 29 has, as shown in FIGS. 13 and 14, a lower die 31 fixed to a lower table 30, an upper die 33 fixed to an upper table 32, and a pallet receiver 34 on which the pallet 28 is mounted. The lower table 30 and upper table 32 are held by a plurality of guide bars 35. The upper table is held movably with the upper die 33 along the guide bars 35. The lower die 31 is divided into two parts, which are spaced apart form each other in a lateral direction. Each part of the die 31 has a recess 31a for use in bending the coil material C. The upper die 33 has a protrusion 33a, which corresponds to the recess 31a in shape.

The upper die 33 has a pair of positioning pins 36 and a pallet presser 37. The positioning pins 36 are provided to extend downwardly from the upper die 33 to place the pallet 28 in position relative to the upper die 33. The pallet presser 37 is used to press the upper surface of the pallet 28 mounted on the pallet receiver 34, when the upper die 33 descends. The pallet receiver 34 is disposed between the divided two parts of the lower die 31, and supported movably in upward and downward directions against the lower table 30 by springs 38. The pallet receiver 34 has a regulation mechanism (not shown), which regulates the mounting position of the pallet 28.

The pallet 28 is for manufacturing the outer coil element 5. Another pallet (not shown) is also used for manufacturing the inner coil element 4. As shown in FIGS. 11 and 12, the pallet 28 has a work receiver 39 for clamping the coil material C and a clamper 40. The work receiver 39 is assembled onto the pallet 28 at the central part in the longitudinal direction of the pallet 28 so that it extends over the entire width of the pallet 28. The width of the pallet 28, i.e., length of the work receiver 39, is set to correspond to the length which is a sum of the axial length of the armature core 3 and a thickness of the two inner insulators 6 attached to the axial sides of the armature core 3.

The damper 40 is supported rotatably by a rotary shaft 41 in the pallet 28. The damper 40 is biased by the spring force of a spring 43 through a taper 42a of a tapered pin 42 fitted with the pallet 28, so that it clamps the coil material C placed in the work receiver 39 under a predetermined clamping force. The coil material C may be unclamped by pressing the tapered pin 42 downwardly.

The pallet 28 is provided with a pair of positioning holes 44 to be engaged with the positioning pins 36 of the upper die 33. Both side surfaces of the pallet 28 in the width direction is flush with the side surfaces of the work receiver 39. The height between the bottom surface of the work receiver 39 and the bottom surface of the pallet 28 is set greater than the length of the end part 5b.

Figure 15:
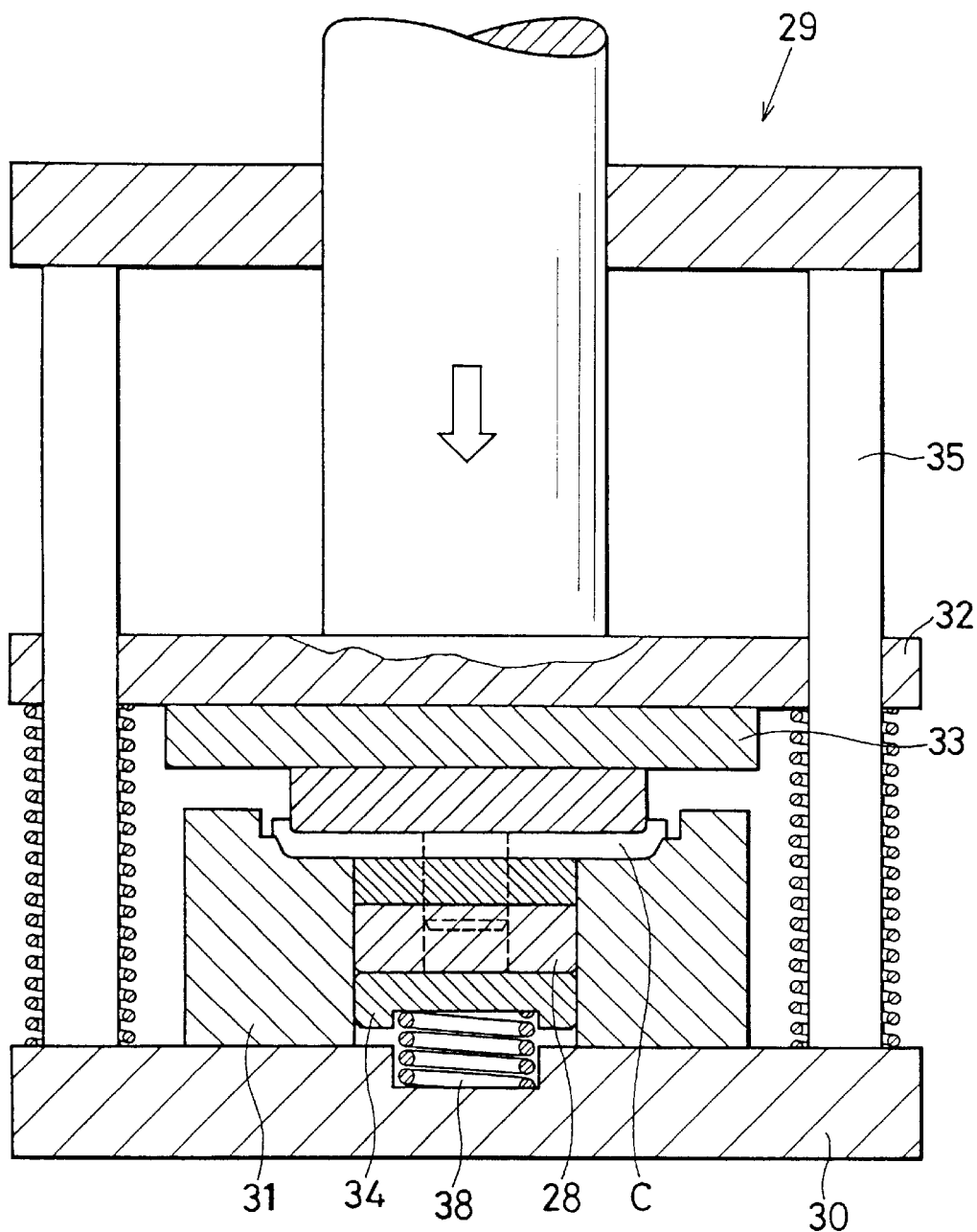
FIG. 15 is a side sectional view showing one operational mode of the manufacturing device shown in FIG. 13.
Figure 16A:
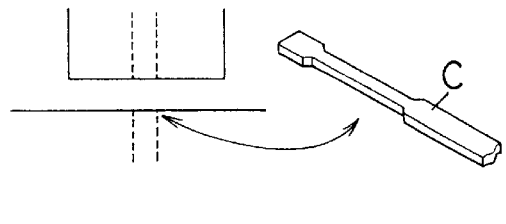
FIGS. 16A–16H are schematic views showing processes of manufacturing the outer coil element used in the first embodiment.
Figure 16B:
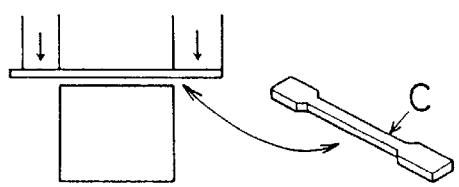
Figure 16C:
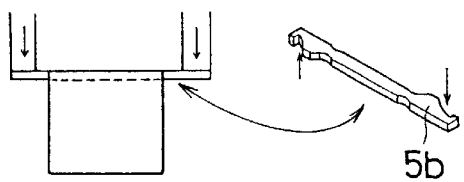
Figure 16D:
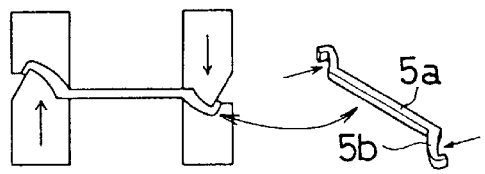
Figure 16E:
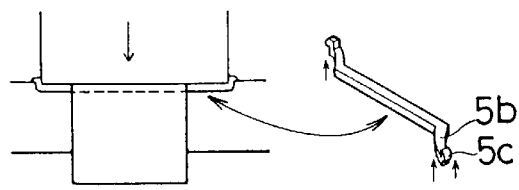
Figure 16F:
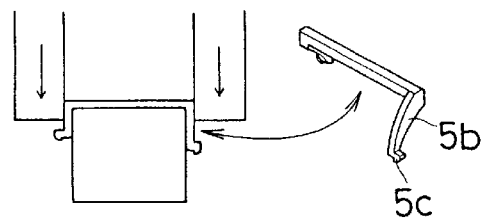
Figure 16G:
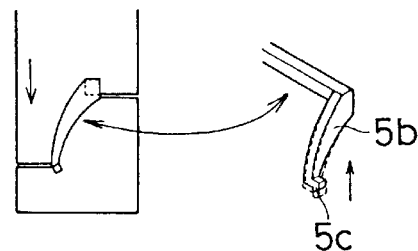
Figure 16H:
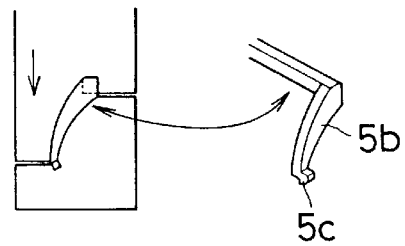

The outer coil element 5 is manufactured through the following steps shown in FIGS. 16A–16H. That is, the coil material C (bare conductor or insulator-coated conductor) is punched out into a series of blank forms for the outer coil elements 5 as shown in FIG. 16A, and cut into single pieces as shown in FIG. 16B. The sides of the root parts of the end parts 5b are cut to optimize the width of the end protrusions 5c as shown in FIG. 16C. The end parts 5b are inclined a predetermined angle against the trunk part 5a on the same plane of the trunk part 5a as shown in FIG. 16D. The end protrusions 5c are punched out as shown in FIG. 16E by using the pallet 28 in the die device 29 shown in FIG. 15, i.e., by moving the presser 33 and the upper table 32 downwardly. By this process, in the same manner as in the above cases (1) and (2), the projections 5d (FIG. 5C) are formed on the inner side of the end protrusions 5c. Then the end parts 5b are bent perpendicularly to the trunk part 5a as shown in FIG. 16F. The end parts 5b are shaped first roughly and finally finely as shown in FIGS. 16G and 16H, respectively.

Figure 17A:
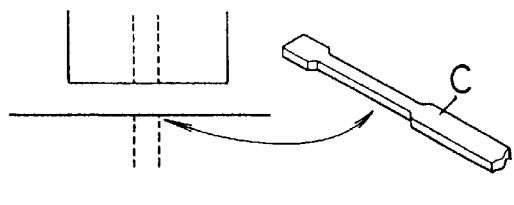
FIGS. 17A–17H are schematic views showing a process of manufacturing the inner coil element used in the first embodiment.
Figure 17B:
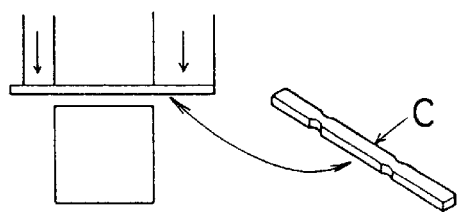
Figure 17C:
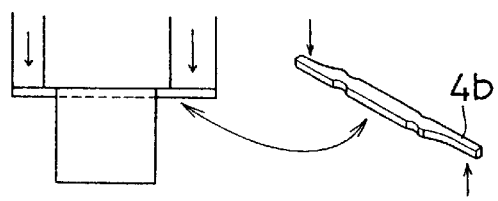
Figure 17D:
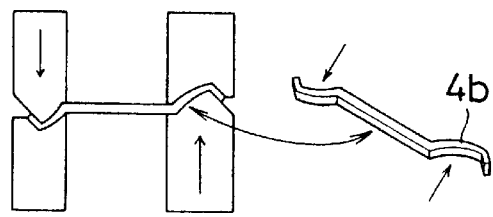
Figure 17E:
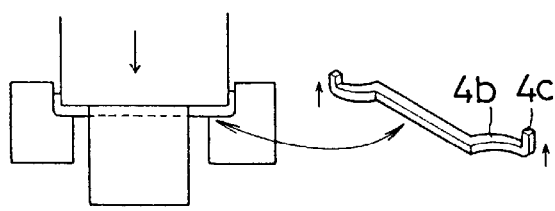
Figure 17F:
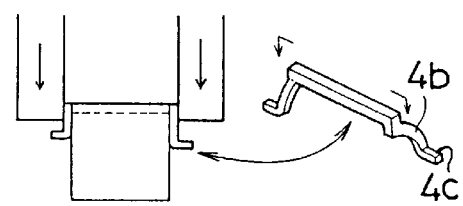
Figure 17G:
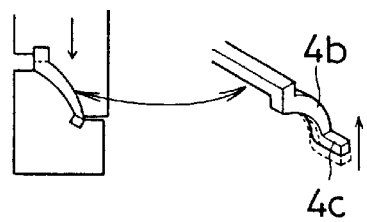
Figure 17H:
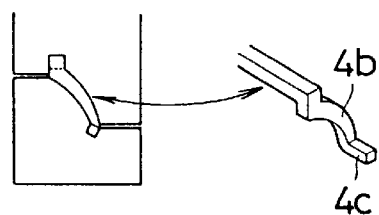
Figure 19A:
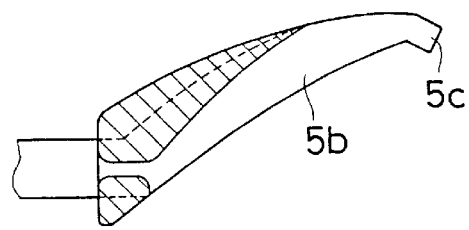
FIGS. 19A–19D are schematic views showing a process of forming a commutator surface on the outer coil element used in the second embodiment.
Figure 19B:
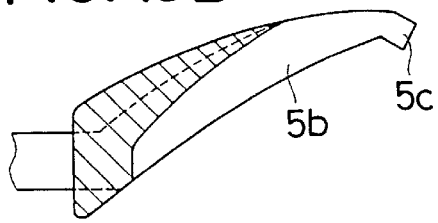

The inner coil element 4 is manufactured through the following steps shown in FIGS. 17A–17H. That is, the coil material C (bare conductor or insulator-coated conductor) is punched out into a series of blank forms for the outer coil elements 4 as shown in FIG. 17A, and cut into single pieces as shown in FIG. 17B. The sides of the root parts of the end parts 4b are cut to optimize the width of the end protrusions 4c as shown in FIG. 17C. The end parts 4b are inclined a predetermined angle against the trunk part 4a on the same plane of the trunk part 4a as shown in FIG. 17D. The end protrusions 4c are punched out as shown in FIG. 17E. Then the end parts 4b are bent generally perpendicularly to the trunk part 4a as shown in FIG. 17F. The end parts 4b are shaped first roughly and finally finely as shown in FIGS. 17G and 17H, respectively.

The armature 1 is manufactured through the following steps. That is, the inner insulators 6 are fitted on the axial sides of the armature core 3. Then, the slot insulator 9 and the trunk part 4a of the inner coil element 4 are inserted into each slot 8, thus assembling the inner coil elements 4 on the entire periphery of the armature core 3. The outer insulators 7 are fitted on the end parts 4b and around the end protrusions 4c of the inner coil element 4. The outer slot insulator 10 and the trunk part 5a of the outer coil element 5 are inserted into the slot 8 and laid over the trunk part 4a of the inner coil element 4, thus assembling the outer coil elements 4 on the entire periphery of the armature core 3. Thus, each end protrusion 4c of the inner coil elements 4 and each end protrusion 5c of the outer coil elements 5 are positioned one atop the other around the rotary shaft 2 to face each other in the radial direction. Finally, the end protrusions 4c and 5c facing each other are joined by the TIG welding (arc welding).

As best shown in FIG. 1, before the TIG welding, the projection 5d formed on the inner surface of the end protrusion 5c abuts the outer surface of the end protrusion 4c at a position axially closer to the axial side of the armature core 3. The inner surface of the protrusion 5c and the outer surface of the protrusion 4c face each other with a spacing therebetween at a position axially farther from the axial side of the armature core 3.

It is preferred that a welding device for TIG welding has an electrode rod 45a which swings while generating a welding torch 45. The welding device may be a type shown in FIG. 34.

In this welding device, the work (assembly of armature core 3, inner coil element 4, outer coil element 5, etc.) is held in position and the welding torch 45 is held closely to the axial end side surface of the end protrusion 5c of the outer coil element 5. Specifically, the top end of the electrode rod 45a of the welding torch 45 is positioned generally above the center of the axial end side surface of the end protrusion 5c.

Under this condition, welding arc generation is started to join the end protrusions 4c and 5c. Thereafter, as shown in FIG. 1, the electrode rod 45a is swung over a predetermined angle at a constant speed between the end protrusions 4c and 5c. After a fixed number of swings of the electrode rod 45a, the swing motion is stopped followed by a stop of welding arc generation. By this welding, as shown in FIG. 2, the joined part 46 is formed into a desired shape. That is, the end protrusions 4c and 5c are melted and joined uniformly, so that the joined part 46 has no cracks and has a high joint strength.

In the first embodiment, as the end protrusions 4c and 5c are separated from each other in the radial direction at the axial ends of the end protrusions 4c and 5c, the welding arc does not jump to other points but jumps surely to the point intended. Therefore, the welding arc can be provided toward the end protrusion 5c first without fail. That is, as welding can be started from the end protrusion 5c of the outer coil element 5 having a larger thermal capacity, the melting condition in the joined part 46 can be maintained good in spite of the difference in thermal capacity and the joined part 46 can be formed in a desired shape. Further, the concavity 5e, which is formed at the root part of the end protrusion 5c before welding as shown in FIG. 5C, prevents cracks from occurring in the joined part 46 and contributes to improve the strength of the joined part 46.

Second Embodiment

In this embodiment, shaping the outer coil element 5 is improved. In order to use the end part 5b as a commutator piece by crushing a part of the coil material C having a rectangular axcross section, the outer coil element 5 may be manufactured as follows through generally known steps.

That is, the rectangular coil material C is cut to a length in correspondence to the blank form of the coil element 5 as shown in FIG. 18. The coil material C is bent a predetermined angle to provide the end parts 5b as shown in FIG. 18B. The end parts 5b are flattened by crushing in the thickness direction as shown in FIG. 18C. The end parts 5b are bent further to become perpendicular to the trunk part 5a as shown in FIG. 18D. The ends of the end parts 5b are punched out to provide the protrusions 5c.

Figure 18A:
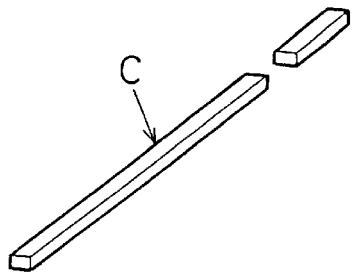
FIGS. 18A–18D are schematic views showing a process of manufacturing the outer coil element used in a second embodiment of the present invention.
Figure 18B:
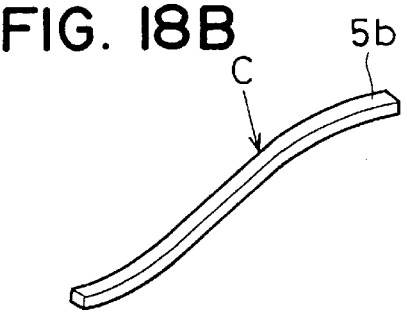
Figure 18C:
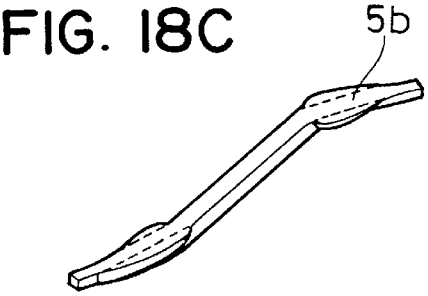
Figure 19C:
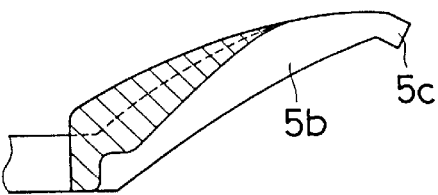
Figure 18D:
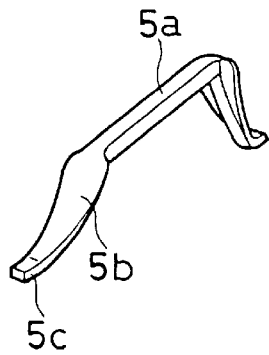
Figure 19D:
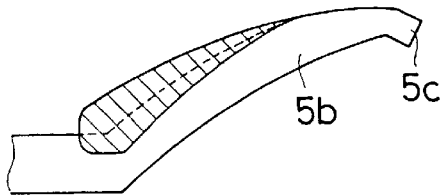

In this manufacturing method, in step shown in FIG. 18C for instance, the sides of the root part of the end parts 5b are cut. Then, a part of the end parts 5b, which is to be used as the commutator piece for a sliding-contact with the brush, is flattened by crushing for a wider contact area. More specifically, as shown in either one of FIGS. 19A–19D, the sliding contact area is ensured by crushing the hatched part of the end part 5b from its original shape shown in dotted lines.

Third Embodiment

In this embodiment, as shown in FIGS. 22A–22B and 23A–23C, an engagement part 47 is formed at the axial end of the trunk part 5a of the outer coil element, so that the outer periphery of the outer insulator 7 is sandwiched tightly between the engagement part 47 and the end part 5b.

Figures 21A, 21B:
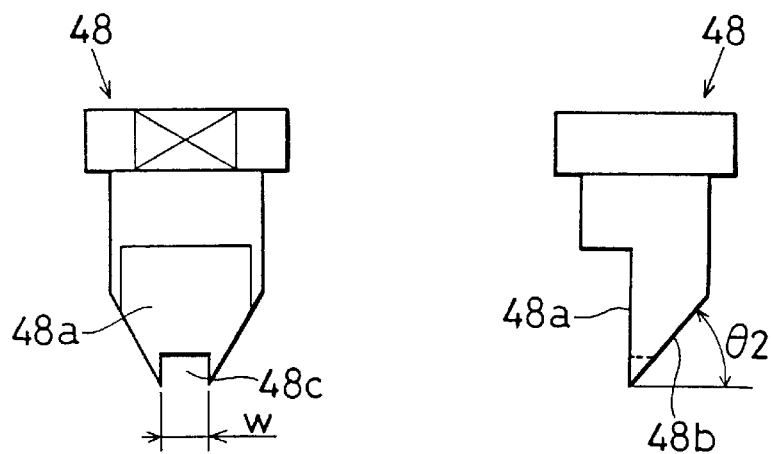
FIGS. 21A and 21B are front and side views of a jig used to form the engagement part shown in FIG. 20.

The engagement part 47 may be formed by using a machining jig 48. As shown in FIGS. 21A and 21B, the machining jig 48 has a flat plane 48a, which is formed by cutting a generally cylindrical material to extend in parallel with its longitudinal axis from its midpoint to its bottom end. Further, it has an inclined plane 48b which extends toward the bottom end and inclines a predetermined acute angle relative to the flat plane 48a. Are leasing groove 48c is formed to have a width w narrower than that of the trunk part 5a of the outer coil element 5.

The engagement part 47 is formed as follows by the use of the machining jig 48.

Figure 20:
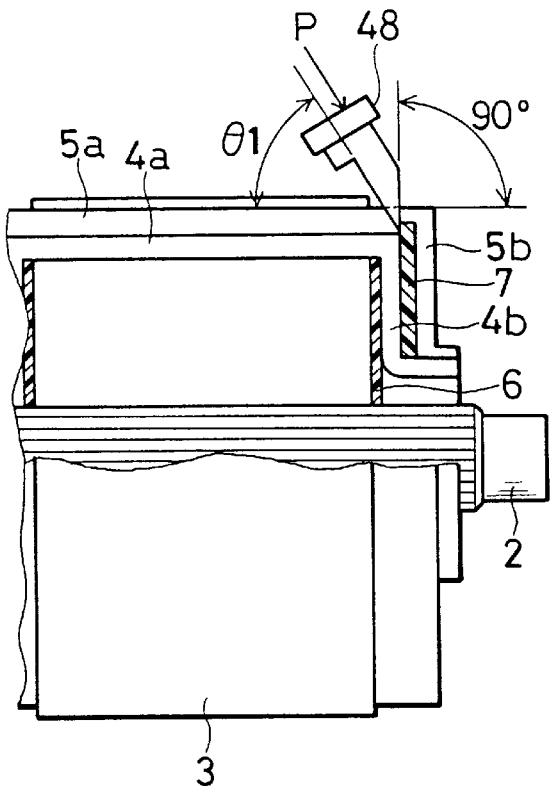
FIG. 20 is a schematic view showing a process of forming an engagement part on the outer coil element used in a third embodiment of the present invention.
Figure 22A:
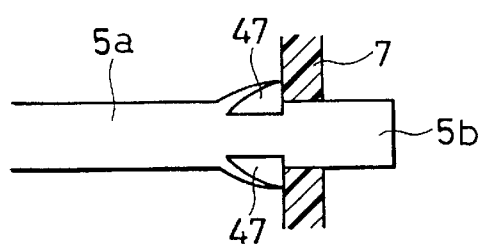
FIGS. 22A and 22B are top and side views of the engagement part shown in FIG. 20.
Figure 22B:
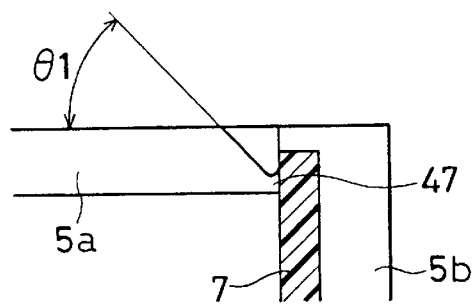

As one method, as shown in FIG. 20, the machining jig 48 is brought to a predetermined position of the trunk part 5a after assembling the inner coil element 4, outer insulator 7, outer coil element 5 and the like onto the armature core 3. More specifically, the bottom end of the machining jig 48 is brought into contact with the outer surface of the trunk part 5a at a position just axially inside of the outer insulator 7. The machining jig 48 is held inclined a predetermined angle relative to the trunk part 5a, so that the inclined surface 48b is generally perpendicular to the trunk part 5a. Subsequently, a force P is applied to the jig 48 in its central axis direction to plastically deform both lateral sides of the trunk part 5a and provide the engagement part 47 (FIGS. 22A and 22B). Thus, the outer periphery of the outer insulator 7 is press-held to the end part 5b of the outer coil element 5.

Figure 23A:
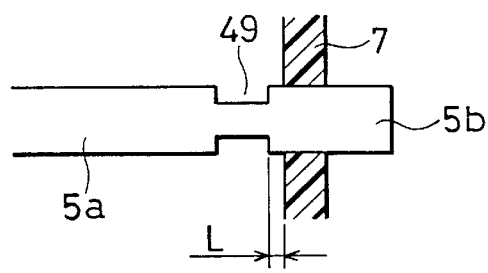
FIGS. 23A–23C are schematic views showing a process for forming the engagement part on the outer coil element used in the third embodiment.
Figure 23B:
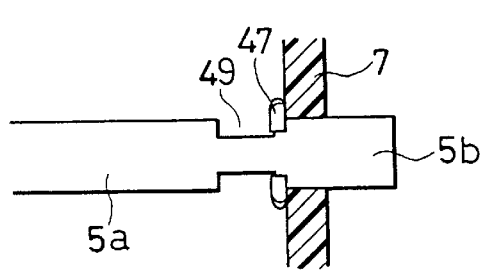
Figure 23C:
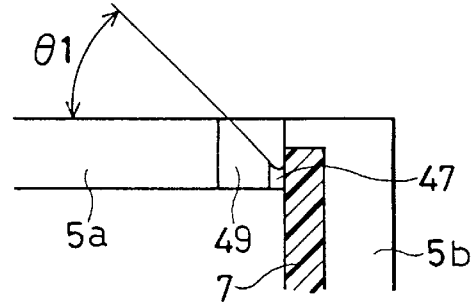

As another method, as shown in FIG. 23A, the engagement part 47 is formed at the axial end of the trunk part 5a by cutting lateral sides of the trunk part 5a into recesses 49. The recesses 47 are formed, while leaving a distance L relative to the outer insulator 7, so that the engagement part 47 is provided thereat. Thereafter, in the same manner as in the first method, the machining jig 48 is used to plastically deform the part having the length L to form the engagement part 47 as shown in FIG. 23A and 23B.

Thus, in the third embodiment, as the outer periphery of the outer insulator 7 is tightly sandwiched between the engagement part 47 of the trunk part 5a and the end part 5b, the outer insulator 7 reduces variations in the relative axial position of the end part 5b to a minimum. As a result, the roughness of the commutator piece using the end part 5b can be suppressed, resulting in an improvement in commutating performance. Further, as the engagement part 47 is formed by plastically deforming the trunk part 5a after assembling the outer insulator 7 and the outer coil element 5 onto the armature core 3, the outer coil element 5 and the outer insulator 7 can be held stably. Particularly, according to the second method, the external force applied to the jig 48 can be reduced compared with the first method in which no recesses are formed before plastically deforming the trunk part 5a. Due to this reduced external force, deformation of the outer coil element 5 which is likely to occur at the time of forming the engagement part 47 can be reduced.

Fourth Embodiment

Figure 24:
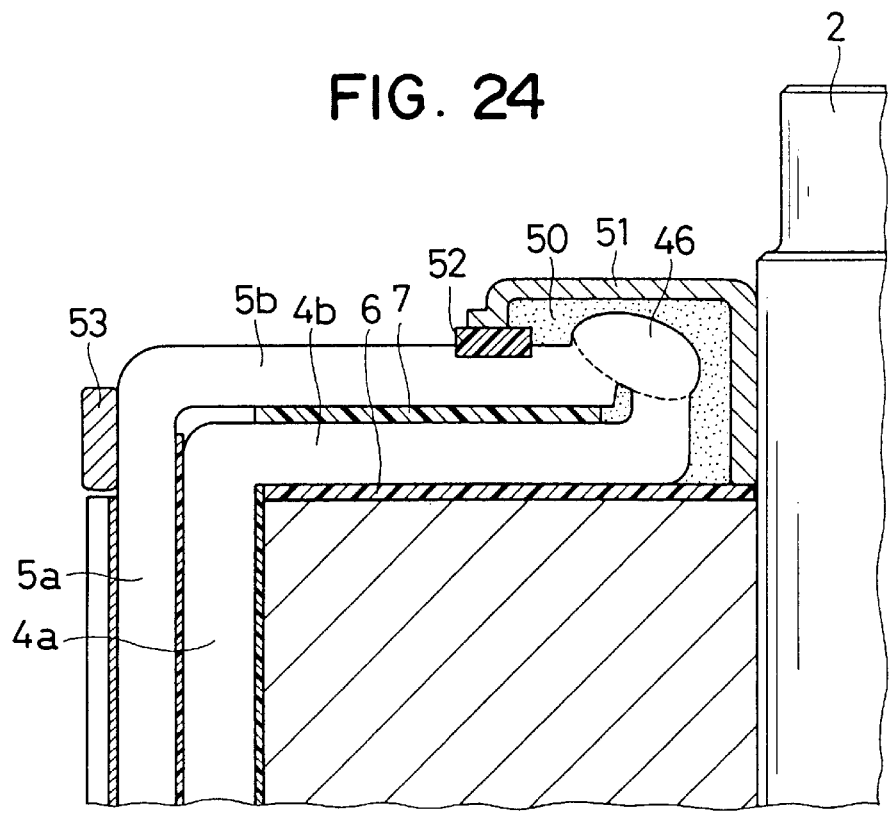
FIG. 24 is an enlarged view of a reinforcing part formed in the joined part of the outer coil element and the inner coil element used in a fourth embodiment of the present invention.

In the fourth embodiment, as shown in FIG. 24, the joined part 46 of the end protrusions 4c and 5c are reinforced by a reinforcing part 50, a collar 51 and an insulator ring 52. A ring member 53 is also fitted around the trunk part 5a of the outer coil element 5.

The reinforcing part 50 is formed by filling resin material (epoxy or phenol thermosetting type) in liquid or in powder form into spaces of the joined part 46 to cover the same and then thermally hardening the resin material. The outer surface of the end part 5b which is used as a commutator surface should be masked, so that the resin material may not cover the commutator surface. Alternatively, a resin material having a high viscosity may be used to restrict its flow to the comutator surface.

The collar 51 is formed into a cup shape and is fitted to cover and hold tightly the reinforcing part 50. The insulator ring 52 is made of a phenol resin including glass fibers, for instance, and is formed into a ring shape. It is interposed between the end part 5b and the collar 51 to provide an insulation therebetween. Thus, insulator ring 52 prevents the outer coil elements 5 from short-circuiting one another.

According to this embodiment, as the joined part 46 is reinforced by the reinforcing part 50, stress caused by the centrifugal force generated during armature rotation can be reduced. Further, as the joined part 46 is restricted from moving in the radial direction and in the circumferential direction, dislocation of the joined part 46 caused by the centrifugal force. Still further, both end parts 4b and 5b are restricted from floating from the axial sides of the armature core 3.

Fifth Embodiment

Figure 25:
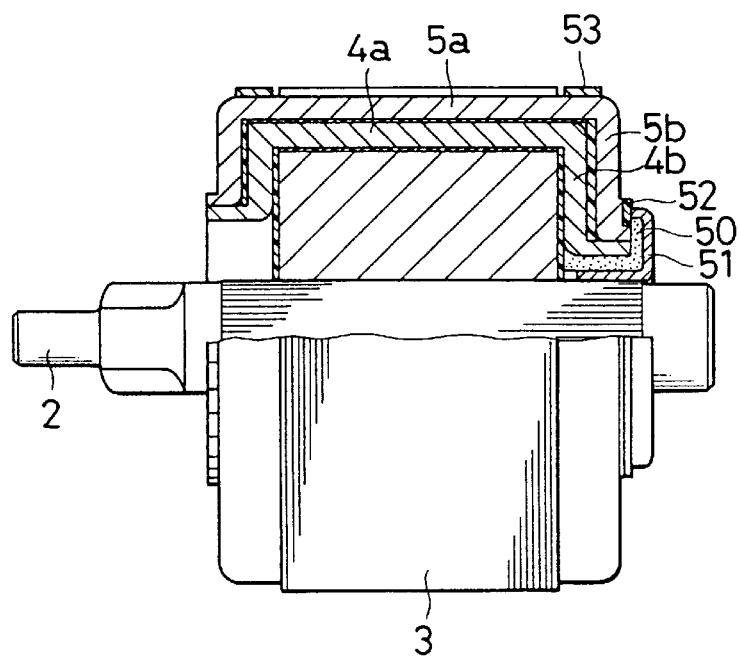
FIG. 25 is a side view showing partly in section the armature having a ring member according to a fifth embodiment of the present invention.

In this embodiment, as shown in FIGS. 24 and 25, the ring member 53 is fitted around the trunk part 5a at each position where the trunk part 5a extends from the slot 8. The ring member 53 reduces the stress applied to the joined part 46 due to the centrifugal force. It should be held axially inside the outer surface (commutator surface) of the end part 5b, so that powder of the brush sliding on the end part 5b does not accumulate on the commutator surface.

Figure 26:
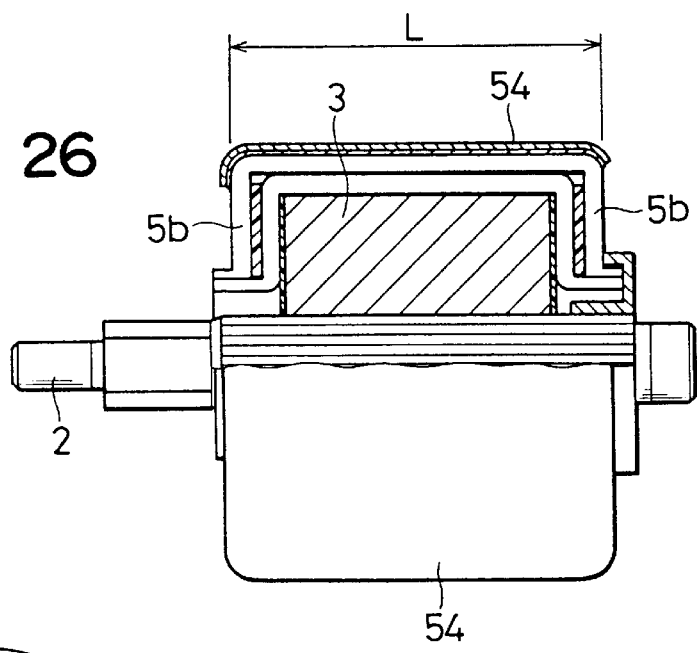
FIG. 26 is a side view showing partly in section the armature having a cylindrical member according to the fifth embodiment of the present invention.
Figure 27:
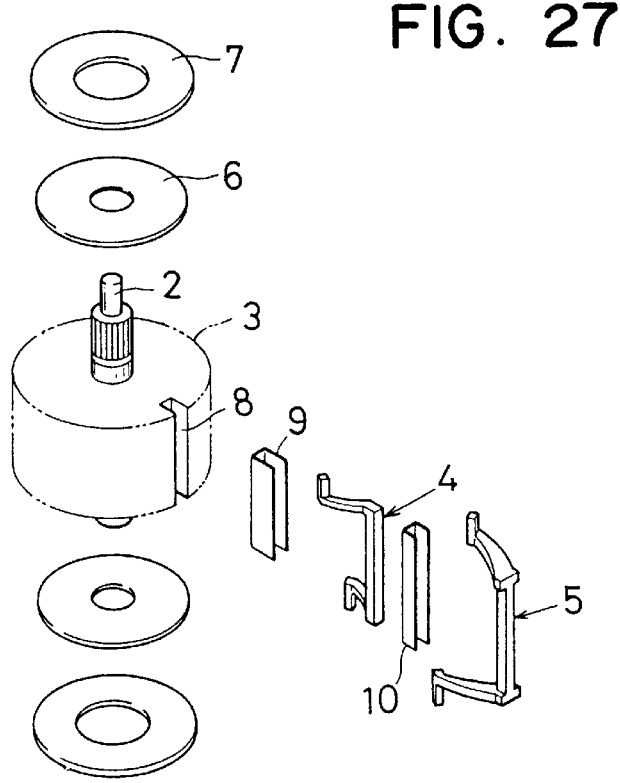
FIG. 27 is an exploded view showing the armature shown in FIG. 26.

The ring members 53 may be replaced by a single cylindrical member 54, which covers the entire circumference of the armature core 3 as shown in FIG. 26. In this instance, the slot 8 is preferably an open type shown in FIG. 27. As opposed to the slot 8 in the first embodiment (FIG. 3), the open type slot 8 has no nails, which are bent to hold the coil elements 4 and 5 in the armature core 3, on the outer periphery of the armature core 3, so that the armature core 3 has a smooth uniform outer cylindrical surface having no convexities. Thus, the cylindrical member 54 can be tightly fitted on the outer cylindrical surface of the armature core 3. The cylindrical member 54 is made of a magnetic material such as iron and has an axial length longer than an axial length L of the armature 3, i.e., length between the outer surfaces of the two end parts 5b of the outer coil element 5.

The cylindrical member 54 is fitted around the armature core 3 in the axial direction, and its both ends are bent radially inwardly. The cylindrical member 54 and the trunk part 5a disposed in the slot 8 are insulated from each other by bending both axial ends of the inner slot insulator 9 and the outer slot insulator 10 to cover the outer peripheral surface of the trunk part 5a. After fitting the cylindrical member 54, an insulating material having a low viscosity (liquid epoxy resin, varnish or the like) is impregnated into the radially inner side of the cylindrical member 54, so that insulating layers may be provided between the armature core 3 and each coil elements 4, 5 and between the coil elements 4 and 5.

The insulating material may be impregnated as follows.

Figure 28:
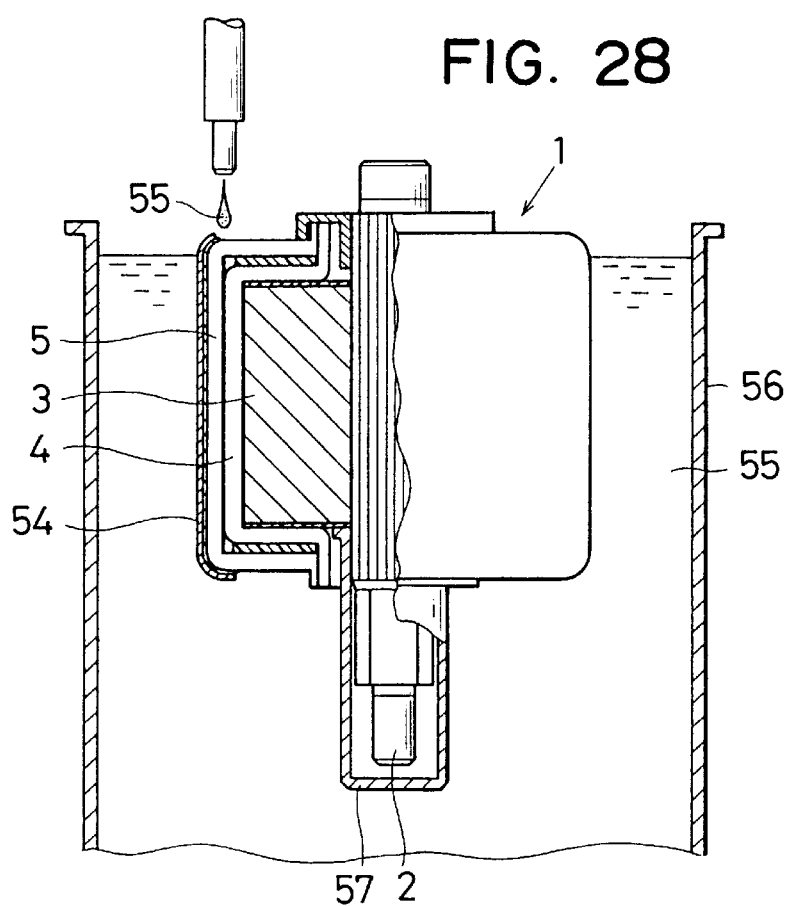
FIG. 28 is a schematic view showing a method of impregnating an insulating material for the armature shown in FIG. 26.

The liquid insulating material 55 is filled into a liquid tank 56 as shown in FIG. 28. The armature 1 is immersed in the liquid insulating material, while maintaining the rotary shaft 1 upright and maintaining the outer surface (commutator surface) of the end part 5b above the liquid level. In this instance, the one end part (lower part in the figure) is covered by a cover 57 fluid-tightly. The armature 1 may be rotated around the rotary shaft 2 to promote impregnation of the insulating material. Further, the insulating material 55 may be dropped from above the armature 1 into the radially inside part of the cylindrical member 54, while avoiding the commutator surface.

Figure 29:
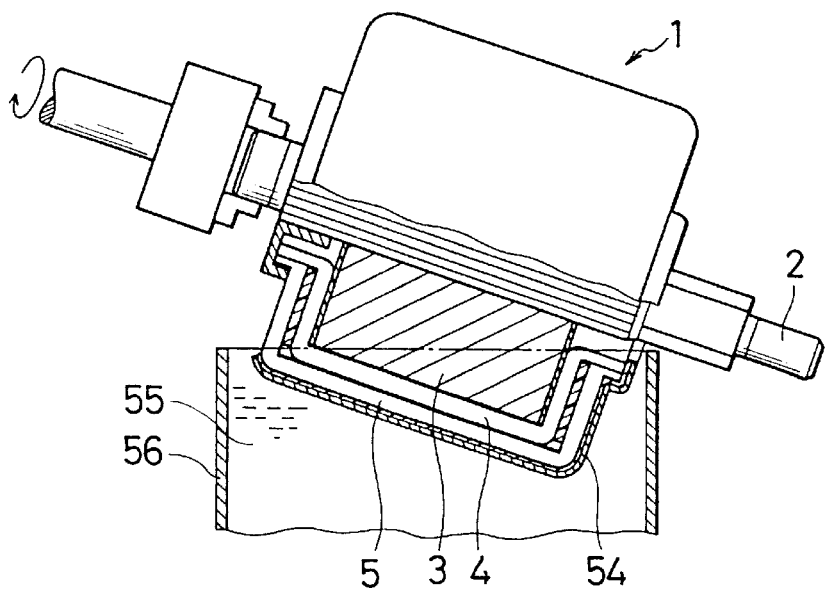
FIG. 29 is a schematic view showing another method of impregnating the insulating material for the armature shown in FIG. 26.

Alternatively, as shown in FIG. 29, the armature 1 may be immersed only partly in the liquid insulating material 55, while maintaining the rotary shaft 2 and the commutator surface above the insulating material by inclining the rotary shaft 2. The armature 1 is rotated around the rotary shaft 2, so that the insulating material 55 fills all the spaces in the armature 1. This method does not necessitate any cover 57 (FIG. 28) for the rotary shaft 2.

According to this embodiment, as the upper coil element 5 is covered by the cylindrical member over its entire length L, the insulating material 55 can be impregnated into the radially inside part of the cylindrical member 54. Thus, any non-insulated parts such as pin holes can be eliminated, resulting in good insulation condition. Particularly, insulation conditions near the both axial ends of the armature core 3 can be provided uniformly. As a result, even when the powder of brush sticks to the surface of the armature 1, the armature core 3 and the coil elements 4 and 5 do not short-circuit through the brush powder.

Further, the insulating material 55 is impregnated into the radially inside part of the cylindrical member, the diameter of the armature 1 is less likely to change and finish-machining can be made unnecessary. As the cylindrical member 54 covers the outer coil element 5 over its entire length L, the axial ends of the trunk part 5a protruding from the slot 8 is less likely to deform in the radially outward direction. As the both ends of the slot insulators 9 and 10 are bent to cover the outer surface of the trunk part 5a, the insulation between the trunk part 5a and the cylindrical member 54 can be ensured. Additionally, as the cylindrical member 54 is made of a magnetic material, an air gap which is to be provided between the armature 1 and a stator (fixed magnetic poles not shown) can be reduced by the thickness of the cylindrical member 54, thereby enhancing motor performance.

Sixth Embodiment

Figure 31:
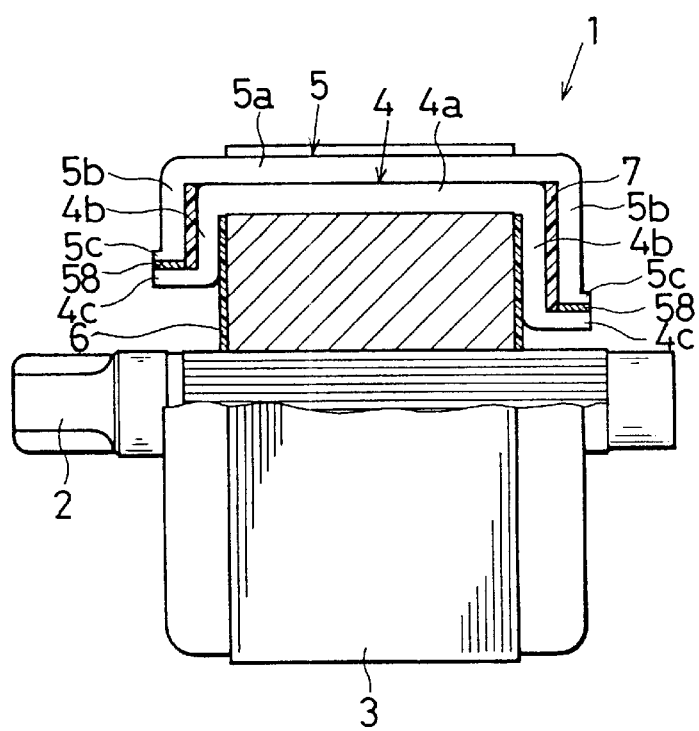
FIG. 31 is a side view showing partly in section the armature according to the sixth embodiment of the present invention.
Figure 32:
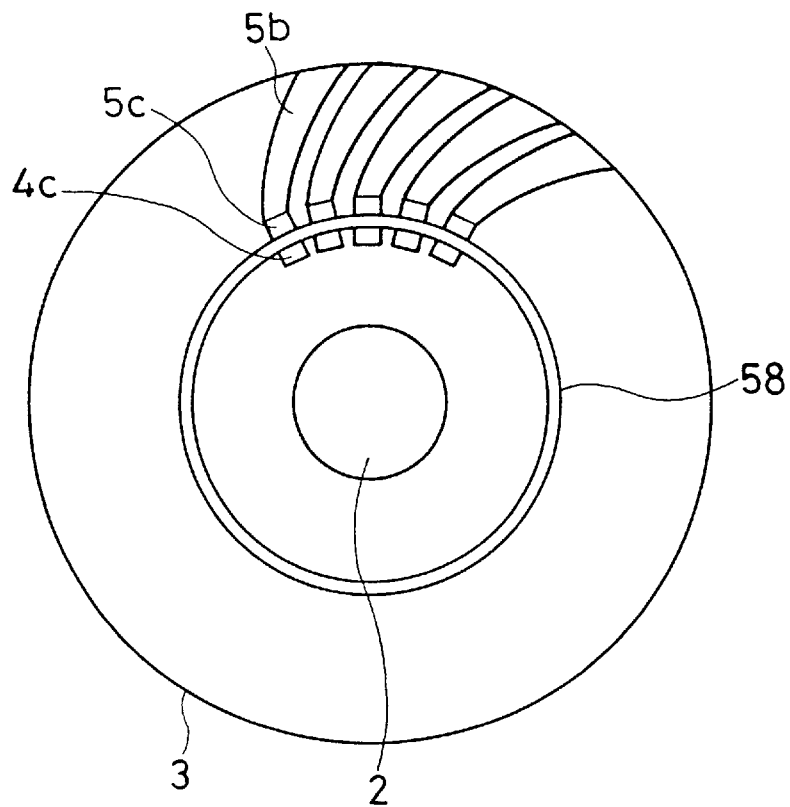
FIG. 32 is a front view showing the brazing material in a ring shape used in the sixth embodiment.
Figure 33:
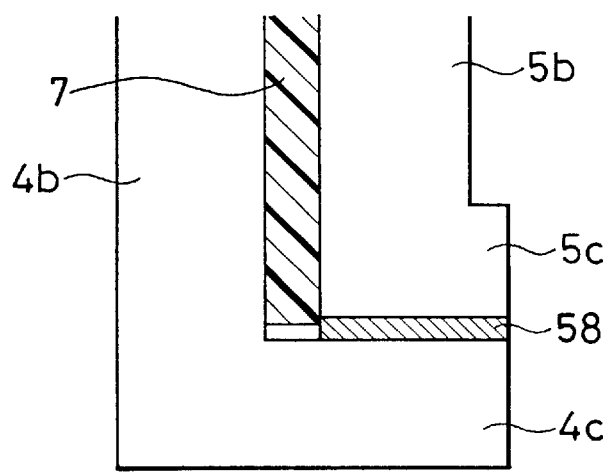
FIG. 33 is an enlarged sectional view showing the brazing material used in the sixth embodiment.

In th is embodiment, a TIG brazing is used to join the end protrusions 4c and n c. As shown in FIGS. 31 and 32, a brazing material formed in an annular shape is interposed between the end protrusions 4c and rc facing each other in the radial direction, so that the brazing material 58 may be melted by the arc welding to join the end protrusions 4c and 5c. As shown in FIG. 33, the width (axial length) of the brazing material 58 is set to substantially the same length as the axial length of the inner surface of the end protrusion 5c.

Figure 34:
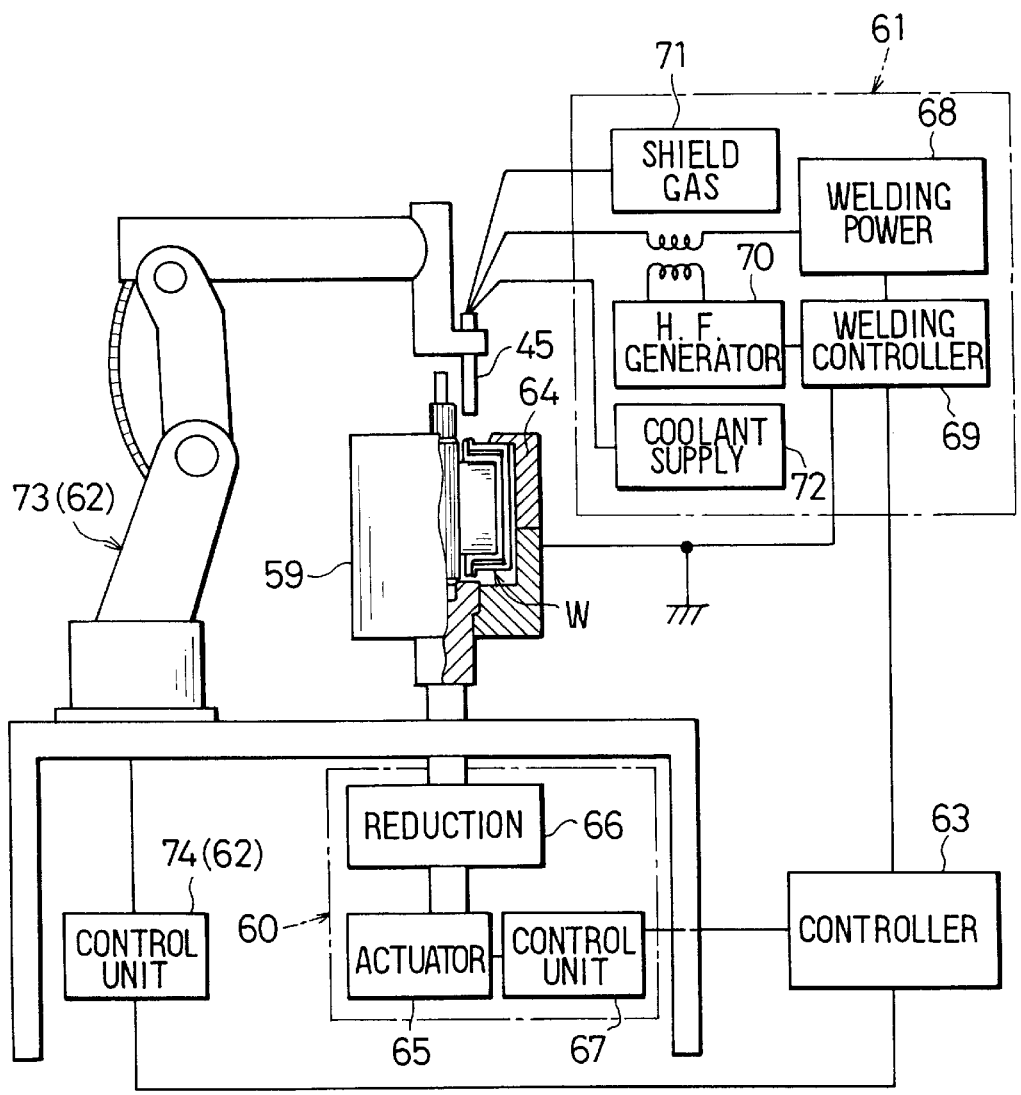
FIG. 34 is a block diagram showing a welding apparatus for welding the brazing material for the armature according to the sixth embodiment.

The welding apparatus comprises, as shown in FIG. 34, a work holder 59 for holding the work W, a rotation driving device 60 for rotating the work W at the specified speed and angle via the work holder 59, the TIG welding device 61 for welding the end protrusions 4c and 5c of the work W, a swing driving device 62 for driving the the welding torch 45 of the TIG welding device 61 to swing, and a controller 63 which controls swing motion of the welding torch 45. The work holder 59 has a grounding jig 64 for grounding the end protrusions 4c and 5c. The grounding jig 64 has a top surface which is held in electrical contact with the end protrusion 5b.

The rotation driving device 60 may be composed of an actuator 65 such as a servo motor which generates a rotary force, a reduction device 66 which transmits the rotary force of the actuator 65 in a reduced speed, and a control unit 67 which controls operation of the actuator 65.

Figure 30:
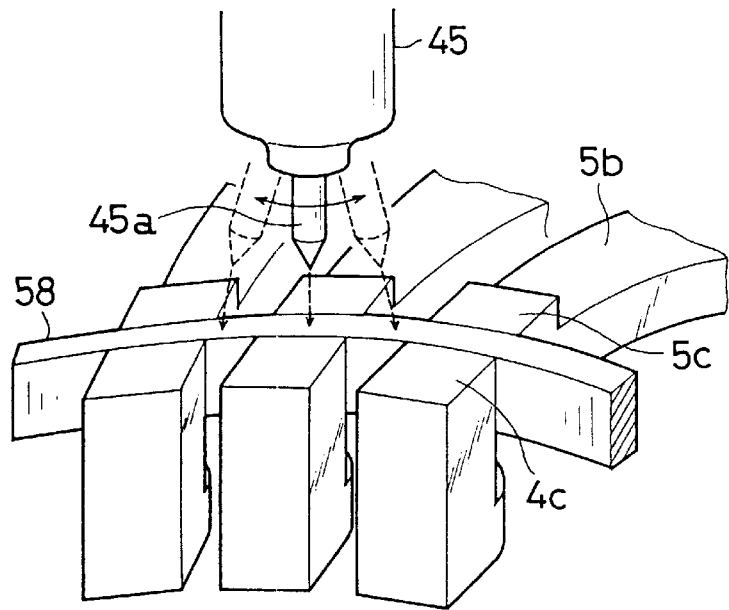
FIG. 30 is a perspective view showing a welding method using a brazing material for joining the outer coil element and the inner coil element used in a sixth embodiment of the present invention.

The TIG welding device 61 may be a conventional type. In addition to the welding torch 45, it has a welding power source (AC or DC) 68, a welding controller 69 which controls on/off of arc, a high frequency generator 70 which generates a high frequency signal necessary for welding operation, a shield gas generator 71 which supplies a shield gas (inert gas) to stabilize welding condition, and a coolant supply device 72 which circulates a coolant throughout the inside of the welding torch 45. As shown in FIG. 30, the welding torch 45 has a swingable electrode rod 45a from which the welding arc is generated.

The swing driving device 62 has a swing robot 73 which swingingly drives the electrode rod 45a at a fixed angle, speed, position and rotational speed while holding the welding torch 45, and a control unit for controlling the swinging operation of the robot 73.

The controller 63 is connected to the control unit 67 for the rotation driving device 60, welding controller 69 for the TIG welding device 61, and control unit 74 for the swing driving device 62, so that it controls through those control units operation (rotational position of the work W) of the rotation driving device 60, and timings of operations of the TIG welding device 61 and swing driving device 62.

Figure 36:
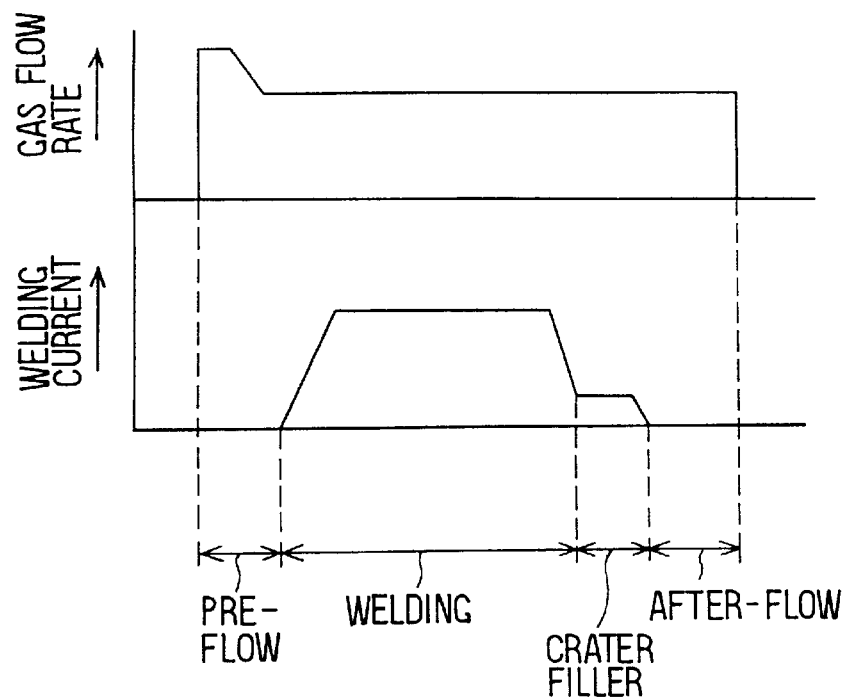
FIG. 36 is a time chart showing changes in a welding current and a gas flow rate during welding operation of the welding apparatus shown in FIG. 34.
Figure 37:
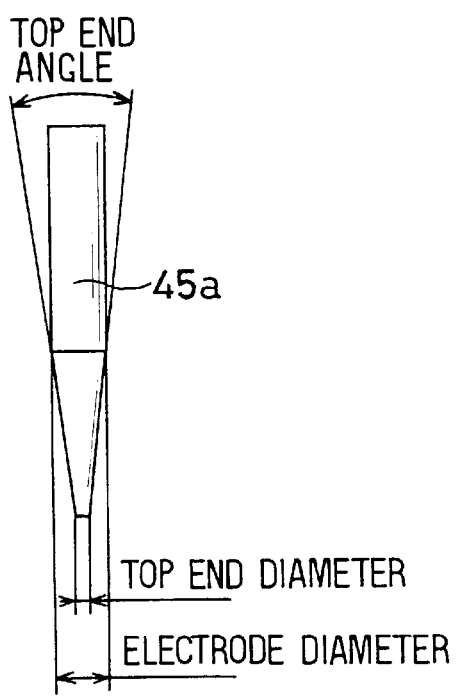
FIG. 37 is a side view showing an electrode rod of a welding torch used in the welding apparatus shown in FIG. 34.

The TIG welding is preferably performed based on the welding conditions shown in FIG. 35, which are defined as follows:

Welding current; current (FIG. 36) supplied to the torch 45a,

Crater filler current; additional current (FIG. 36) supplied at the time of completion of welding to improve surface condition of the melted part, Crater filler period; period (FIG. 36) for supplying a crater filler current, Arc length; distance between electrode rod 45a and work weaving times; number of times of swinging electrode rod 45a Weaving swing speed; swing speed of electrode rod 45a, Weaving swing width; width of swing of top end of electrode rod, Electrode diameter; as defined in FIG. 37, Electrode material; material of electrode rod 45a, WL and WY being tungsten with oxides, La2o3 and Y2O3, respectively, Electrode top end diameter; as defined in FIG. 37, Electrode top end angle; as defined in FIG. 37, Gas flow rate; flow amount of shied gas (FIG. 36) during welding operation, Gas pre-flow; period (FIG. 36) of supplying shield gas before welding, and Gas after-flow; period (FIG. 36) of supplying shield gas after welding.

In welding operation of the above welding apparatus, the work W is held in position by the work holder 59, while maintaining the electrical contact of the top end surface of the grounding jig 64 with the end part 5b. The work W is driven by the rotation drive device 60 to rotate in the specified direction and stop at the specified position thereby defining the end parts 4c and 5c to be welded.

Then, the welding torch 45 is moved closely to the end protrusions 4c and 5c by the swing robot 73 and stopped at the specified position to start welding. As shown in FIG. 30, the welding is started from the center of thickness of the brazing material 58 and from the center of the circumference of the end protrusions 4c and 5c.

Figure 38:
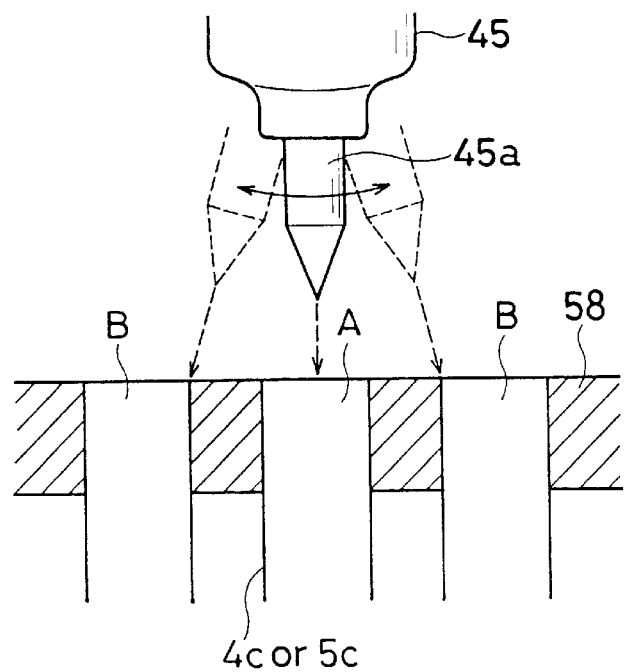
FIG. 38 is a schematic view showing the brazing material and the electrode rod before the welding operation of the welding apparatus shown in FIG. 34.

Immediately after generating the arc, the electrode rod 45a of the welding torch 45 is driven to swing in the circumferential direction back and forth as shown in FIG. 38. The swing width of the electrode rod 45a is defined to cover the mid points, each mid point being between one pair (A) of the end protrusions and adjacent pair (B) of the same as shown in FIG. 38. More specifically, the electrode rod 45a is driven to swing so that the arc reaches the circumferential corners of the end protrusions of the adjacent pair B. The number of swings of the electrode rod 45a is preferably 2–7 times, although it depends on the shape of the end protrusions 4c and 5c. During the swing motion, the welding current, gas flow rate and the like are maintained unchanged as shown in FIG. 35.

After driving the electrode rod 45a several times, the electrode rod 45a is stopped from swinging further by the swing drive device 62 at the time the electrode rod 45a reaches the specified swing stop position (e.g., circumferential center of the end protrusions 4c ad 5c). The arc is stopped thereafter.

Figure 39:
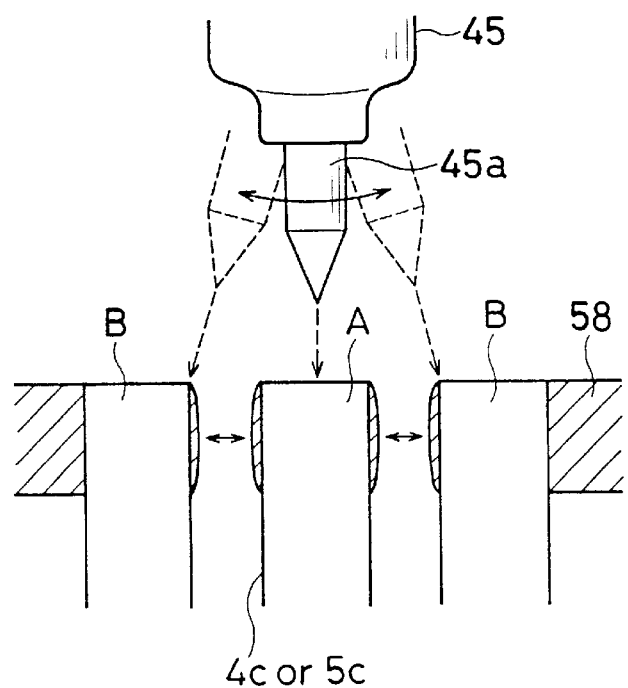
FIG. 39 is a schematic view showing the brazing material and the electrode rod after the welding operation of the welding apparatus shown in FIG. 34.

During the above welding operation, the brazing material 58 interposed between the end protrusions 4c and 5c melts by the thermal energy of the arc and fills the space between the end protrusions 4c and 5c, thereby joining the end protrusions 4c and 5c. The brazing material located between the end protrusion pairs A and B also is melted and pulled in the direction of swing movement of the arc. Thus, as shown in FIG. 39, the brazing material 58 is cut between the pairs A and B.

The above welding operation is repeated for each pairs of end protrusions 4c and 5c.

Figure 40A:
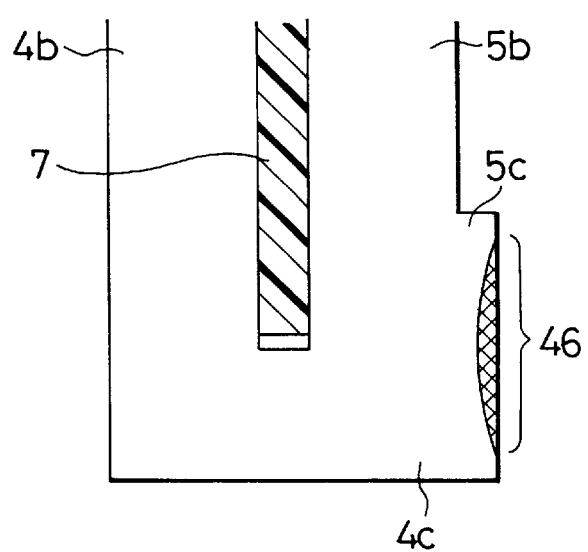
FIGS. 40A and 40B are side sectional and front sectional views showing joined part of the outer coil element and the inner coil element used in the sixth embodiment.
Figure 40B:
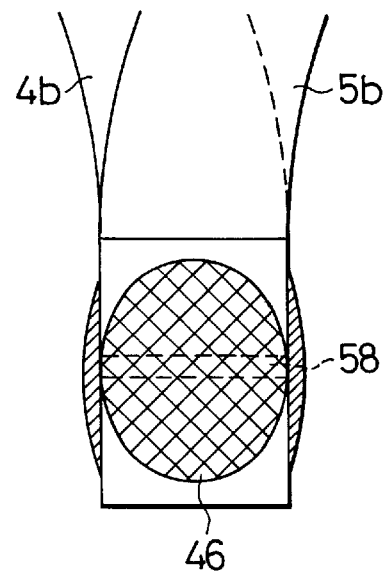

As a result of this welding method, only the axial end sides of the protrusions 4c and 5c as well as the brazing material 58 interposed between the end protrusions 4c and 5c are melted by the thermal energy of the arc. That is, the end protrusions 4c and 5c are joined to each other without substantially melting the radially inner surface of the end protrusion 5c and the radially outer surface of the end protrusion 4c. Further, the melted brazing material 58 not only fills the space between the end protrusions 4c and 5c but also forms a fillet at the side close to the outer insulator 7 as shown in FIGS. 40A and 40B. That is, the melted brazing material 58 provides an obtuse angle shape against the radially outer surface of the end protrusion 4c.

According to the sixth embodiment, as the brazing material 58 fills the space between the end protrusions 4c and 5c, the incomplete joining between the end protrusions 4c and 5c, which would otherwise be caused when the end protrusions are arc-welded directly without brazing material, can be obviated. As the joined part 46 can be provided without substantially melting the end protrusions 4c and 5c, the radially outer surface of the end protrusion 5c of the outer coil element 5 does convex radially outwardly. As a result, the anti-fatigue strength of the joined part 46 can be improved to ensure the strength against the centrifugal force which exerts on the joined part 46 during the armature rotation.

Further, as the arc is swung to reach the circumferential spacing between the pairs A and B, the brazing material between the pairs A and B is cut at the same time as welding the end protrusions 4c and 5c. Thus, the pairs A and B are effectively prevented from being bridged by the brazing material. As a result, the brazing material 58 may be a single ring shape which obviates necessity of interposing a plurality of brazing materials one by one for each pair of end protrusions to be welded.

As the outer surface of the end protrusion 4c and the inner surface of the end protrusion 5c do not melt substantially, the crystal grains of the end protrusions 4c and 5c are prevented from growing larger. Thus, hardness of the end protrusions 4c and 5c can be maintained as it is before being welded.

Further, as the joined part 46 forms the fillet by the brazing material at a side closer to the armature core 3, the centrifugal force exerted to the joined part 46 can be dispersed, thus improving the anti-fatigue strength.

Modification

The electrode rod 45a may be limited to swing to cover only one circumferential space between the pairs A and B to cut the brazing material 58 existing in such a space at one time, without cutting the brazing material 58 existing in both spaces of between the pairs A and B at one time. It is also possible to move the welding torch 45 generally in parallel with each pair of the end protrusions 4c and 5c, without swinging the welding torch 45. In stead of moving the welding torch 45 or electrode rod 45a, the work W may be moved or both may be moved.

The present invention should not be limited to the disclosed embodiments and modifications, but may be implemented by other embodiments without departing from the spirit of the invention.

We claim:

1. A method of manufacturing an armature for rotary electric machine having an armature core having a plurality of slots on an outer periphery thereof and a rotary shaft supporting the armature core, the method comprising the steps of:

assembling a plurality of inner coil elements in the slots of the armature core, each inner coil element having a straight inner trunk part, an inner end part bent substantially perpendicularly from an end of the inner trunk part along an axial side of the armature core and inclined with respect to the inner trunk part, and an inner end protrusion extending from an end of the inner end part in an axial direction away from the armature core;

assembling a plurality of outer coil elements on the inner coil elements, each outer coil element having a straight outer trunk part, an outer end part bent substantially perpendicularly from an end of the outer trunk part along the axial side of the armature core and inclined with respect to the outer trunk part, and an outer end protrusion extending from an end of the outer end part in the axial direction away from the armature core; and arc welding the outer end protrusion and the inner end protrusion to one another under a condition that the outer end protrusion and the inner protrusion are spaced apart from each other in a radial direction of the armature core at axial ends of the end protrusions, and are in contact with each other at a position axially inside of the axial ends of the end protrusions.

2. A method of claim 1, wherein the outer end protrusion has a projection which contacts the inner end protrusion.

3. A method of claim 1, wherein the welding step includes:

positioning a welding torch to face a surface of an axial end of the outer end protrusion in the axial direction;

starting welding from the outer end protrusion; and swinging the welding torch between the outer end protrusion and the inner end protrusion.

4. A method of claim 1, further comprising the steps of:

forming a reinforcing part by an insulating material over a joined part of the inner end part and the outer end part;

fitting a collar over the reinforcing part; and fitting an insulator between the collar and the outer end part.

5. A method of claim 2, further comprising the steps of:

forming a blank shape of each outer coil element;

bending the blank shape into the outer trunk part and the outer end part, while maintaining a straight part of the blank shape and inclining the outer end part a predetermined angle from the straight part;

punching out the outer end protrusion and providing the projection on a radially inner surface of the outer end protrusion;

bending the outer end part perpendicularly from the outer trunk part; and shaping the outer end part.

6. A method of claim 5, wherein the blank shape forming step includes:

punching a plurality of blank shapes of the outer coil elements from a rod-like coil material in a serially connected manner; and cutting the serially connected blank shapes into each blank form.

7. A method of claim 5, wherein the blank shape forming step includes punching the blank shape from a planar coil material.

8. A method of claim 5, wherein the steps subsequent to the blank shape forming step are attained on a specified stage, while holding the blank shape on the specified stage.

9. A method of claim 5, wherein the steps subsequent to the blank shape forming step are attained on respective stages, while holding the blank shape on a pallet and transferring the pallet to the respective stages.

10. A method of claim 5, further comprising the steps of:

cutting sides of a root part of the outer end part before the blank form forming step; and flattening a specified part of the outer end part to increase an area of the specified part to be used as a commutator surface.

11. A method of claim 2, wherein the welding step melts the outer end part and the inner end part at only axially outside part from the projection, while maintaining the space at axially inside part from the projection.

12. A method of manufacturing an armature for rotary electric machine having an armature core having a plurality of slots on an outer periphery thereof and a rotary shaft supporting the armature core, the method comprising the steps of:

assembling a plurality of inner coil elements in the slots of the armature core, each inner coil element having a straight inner trunk part, an inner end part bent substantially perpendicularly from an end of the inner trunk part along an axial side of the armature core and inclined with respect to the inner trunk part, and an inner end protrusion extending from an end of the inner end part in an axial direction away from the armature core;

assembling a plurality of outer coil elements on the inner coil elements, each outer coil element having a straight outer trunk part, an outer end part bent substantially perpendicularly from an end of the outer trunk part along the axial side of the armature core and inclined with respect to the outer trunk part, and an outer end protrusion extending from an end of the outer end part in the axial direction away from the armature core;

arc welding the outer protrusion and the inner end protrusion to one another under a condition that the outer end protrusion and the inner protrusion are spaced apart from each other in a radial direction of the armature core at axial ends of the end protrusions, and are in contact with each other at a position axially inside of the axial ends of the end protrusions;

interposing a ring-shaped insulator between the outer end part and the inner end part; and forming an engagement part, which sandwiches an outer periphery of the ring-shaped insulator relative to the outer end part, by plastically deforming a part of the outer trunk part after assembling the inner coil element, the ring-shaped insulator and the outer coil element on the armature core.

13. A method of claim 1, further comprising the steps of:

forming the slots in an open type;

forming a cylindrical member having a diameter corresponding to a diameter of the armature core and having an axial length greater than an axial length of the armature core; and fitting the cylindrical member onto the armature core tightly to cover an entire axial length of the outer trunk part after the outer coil element and the inner coil element are assembled on the armature core.

14. A method of of manufacturing an armature for rotary electric machine having an armature core having a plurality of slots on an outer periphery thereof and a rotary shaft supporting the armature core, the method comprising the steps of:

assembling a plurality of inner coil elements in the slots of the armature core, each inner coil element having a straight inner trunk part, an inner end part bent substantially perpendicularly from an end of the inner trunk part along an axial side of the armature core and inclined with respect to the inner trunk part, and an inner end protrusion extending from an end of the inner end part in an axial direction away from the armature core;

assembling a plurality of outer coil elements on the inner coil elements, each outer coil element having a straight outer trunk part, an outer end part bent substantially perpendicularly from an end of the outer trunk part along the axial side of the armature core and inclined with respect to the outer trunk part, and an outer end protrusion extending from an end of the outer end part in the axial direction away from the armature core;

arc welding the outer end protrusion and the inner end protrusion to one another under a condition that the outer end protrusion and the inner protrusion are spaced apart from each other in a radial direction of the armature core at axial ends of the end protrusions, and are in contact with each other at a position axially inside of the axial ends of the end protrusions; and filling an insulating material into spaces existing radially inside of the cylindrical member.

15. A method of manufacturing an armature for rotary electric machine having an armature core having a plurality of slots on an outer periphery thereof and a rotary shaft supporting the armature core, the method comprising the steps of:

assembling a plurality of inner coil elements in the slots of the armature core, each inner coil element having a straight inner trunk part, an inner end part bent substantially perpendicularly from an end of the inner trunk part along an axial side of the armature core and inclined with respect to the inner trunk part, and an inner end protrusion extending from an end of the inner end part in an axial direction away from the armature core;

assembling a plurality of outer coil elements on the inner coil elements, each outer coil element having a straight outer trunk part, an outer end part bent substantially perpendicularly from an end of the outer trunk part along the axial side of the armature core and inclined with respect to the outer trunk part, and an outer end protrusion extending from an end of the outer end part in the axial direction away from the armature core;

interposing a ring-shaped brazing material between the end protrusions of the outer coil element and the inner coil element facing in a radial direction of the armature core; and welding the outer end protrusion and the inner end protrusion by directing a welding torch to the brazing material to melt the brazing material, wherein at least one of the welding torch and the armature core is moved a specified distance reciprocally in a circumferential direction of the armature core so that the brazing material existing between two adjacent pairs of the outer end protrusion and the inner end protrusion are melted and cut out.

16. A method of claim 15, wherein the welding step includes moving one of the armature core and the welding torch in the circumferential direction by a distance greater than a circumferential width of the outer end protrusion and the inner end protrusion.

17. A method of claim 15, wherein the welding is performed under conditions that:

a current to the welding torch is less than 30A;

an arc length from a top end of the welding torch to the brazing material is between 0.5 mm and 1.5 mm;

a speed of moving between the welding torch and the armature core is between 5 mm and 15 mm per second; and a number of reciprocal movements between the welding torch and the armature core is between 2 times and 7 times.

18. A method of claim 15, wherein the welding is performed to melt substantially only the brazing material.

19. A method of claim 15, wherein the welding is performed to form a fillet shape by the melted brazing material at an axially innermost side thereof.

20. A method of manufacturing an armature for rotary electric machine having an armature core having a plurality of slots on an outer periphery thereof and a rotary shaft supporting the armature core, the method comprising the steps of:

assembling a plurality of inner coil elements in the slots of the armature core, each inner coil element having a straight inner trunkpart, an inner end part bent substantially perpendicularly from an end of the inner trunk part along an axial side of the armature core and inclined with respect to the inner tunk part, and an inner end protrusion extending from an end of the inner end part in an axial direction away from the armature core;

assembling a plurality of outer coil elements on the inner coil elements, each outer coil element having a straight outer trunk part, an outer end part bent substantially perpendicularly from an end of the outer trunk part along the axial side of the armature core and inclined with respect to the outer trunk part, and an outer end protrusion extending from an end of the outer end part in the axial direction away from the armature core;

arc welding the outer end protrusion and the inner end protrusion to one another;

interposing a ring-shaped insulator between the outer end part and the inner end part; and forming an engagement part, which sandwiches an outer periphery of the ring-shaped insulator relative to the outer end part, by plastically deforming a part of the outer trunk part after assembling the inner coil element, the ring shaped insulator and the outer coil element on the armature core.

21. A method of manufacturing an armature for rotary electric machine having an armature core having a plurality of slots on an outer periphery thereof and a rotary shaft supporting the armature core, the method comprising the steps of:

assembling a plurality of inner coil elements in the slots of the armature core, each inner coil element having a straight inner trunk part, an inner end part bent substantially perpendicularly from an end of the inner trunk part along an axial side of the armature core and inclined with respect to the inner trunk part, and an inner end protrusion extending from an end of the inner end part in an axial direction away from the armature core;

assembling a plurality of outer coil elements on the inner coil elements, each outer coil element having a straight outer trunk part, an outer end part bent substantially perpendicularly from an end of the outer trunk part along the axial side of the armature core and inclined with respect to the outer trunk part, and an outer end protrusion extending from an end of the outer end part in the axial direction away from the armature core;

arc welding the outer end protrusion and the inner end protrusion to one another; and filling an insulating material into spaces existing radially inside of the cylindrical member.

* * * * *